United States Patent
Magyari

(10) Patent No.: US 9,250,444 B2
(45) Date of Patent: Feb. 2, 2016

(54) HEAD MOUNTED DISPLAY DEVICE

(75) Inventor: Douglas Peter Magyari, Royal Oak, MI (US)

(73) Assignee: IMMY INC., Troy, MI (US)

( * ) Notice: Subject to any disclaimer, the term of this patent is extended or adjusted under 35 U.S.C. 154(b) by 407 days.

(21) Appl. No.: 13/510,423

(22) PCT Filed: Nov. 21, 2009

(86) PCT No.: PCT/US2009/065420
§ 371 (c)(1),
(2), (4) Date: May 17, 2012

(87) PCT Pub. No.: WO2011/062591
PCT Pub. Date: May 26, 2011

(65) Prior Publication Data
US 2012/0229367 A1 Sep. 13, 2012

(51) Int. Cl.
*G02B 27/01* (2006.01)

(52) U.S. Cl.
CPC .... *G02B 27/0172* (2013.01); *G02B 2027/0118* (2013.01); *G02B 2027/0127* (2013.01); *G02B 2027/0178* (2013.01)

(58) Field of Classification Search
None
See application file for complete search history.

(56) References Cited

U.S. PATENT DOCUMENTS

| | | |
|---|---|---|
| 3,923,370 A | 12/1975 | Mostrom |
| 4,352,951 A | 10/1982 | Kyle |
| 5,093,567 A | 3/1992 | Staveley |
| 5,543,968 A | 8/1996 | Freeman et al. |
| 5,598,231 A | 1/1997 | Lin |
| 5,663,833 A | 9/1997 | Nanba et al. |
| 5,699,194 A | 12/1997 | Takahashi |
| 5,701,202 A | 12/1997 | Takahashi |
| 5,706,136 A | 1/1998 | Okuyama et al. |

(Continued)

FOREIGN PATENT DOCUMENTS

| | | |
|---|---|---|
| EP | 0460983 | 12/1991 |
| EP | 0632303 | 1/1995 |

(Continued)

OTHER PUBLICATIONS

"Sony HMZ-T1 Personal 3D Viewer" Retrieved from the Internet: URL:http://store.sony.com/p/Wearable-HDTV/en/p/HMZT1 Sony Product; HMZ-T3W 3D Personal Viewer—http://store.sony.com/wearable-hdtv-2d-3d-virtual-7.1-surround-sound-zid27-HMZT3W/cat-27-catid-3D-Personal-Viewer;pgid=xxxxxxxxxxxxxxxxxxxxxxxxxxxxxxxxx?_t=pfm%3Dcategory%26pfmvalue%3Dfaceted [retrieved on Jan. 15, 2014] (4 pages).

(Continued)

*Primary Examiner* — Kenneth B Lee, Jr.
(74) *Attorney, Agent, or Firm* — Dicke, Billig & Czaja, PLLC

(57) ABSTRACT

Disclosed is a primarily reflective-based head mounted display device, for displaying and viewing visual content from a visual display source, including a frame, at least one optics housing connected to said frame, wherein the optics housing and frame are configured such that the optics housing may be positioned at least partially in front of an eye of a user, and wherein the optics housing includes a light-emitting visual source disposed within the optics housing for projecting visual content, and a plurality of reflective optical surfaces in optical communication with the light-emitting visual source that are configured to reflect a projection of the visual content into the eye of the user.

59 Claims, 10 Drawing Sheets

(56) References Cited

U.S. PATENT DOCUMENTS

| | | | |
|---|---|---|---|
| 5,844,530 | A | 12/1998 | Tosaki |
| 5,880,888 | A * | 3/1999 | Schoenmakers et al. ..... 359/630 |
| 5,886,822 | A | 3/1999 | Spitzer |
| 5,886,824 | A | 3/1999 | Takahashi |
| 5,903,243 | A | 5/1999 | Jones |
| 6,084,555 | A | 7/2000 | Mizoguchi et al. |
| 6,147,807 | A | 11/2000 | Droessler et al. |
| 6,292,301 | B1 | 9/2001 | Kuramochi et al. |
| 6,310,728 | B1 | 10/2001 | Okuyama et al. |
| 6,369,952 | B1 * | 4/2002 | Rallison et al. ............... 359/630 |
| 6,417,970 | B1 | 7/2002 | Travers et al. |
| 6,573,952 | B1 | 6/2003 | Yamazaki et al. |
| 6,618,099 | B1 | 9/2003 | Spitzer |
| 6,683,584 | B2 | 1/2004 | Ronzani et al. |
| 7,310,072 | B2 | 12/2007 | Ronzani et al. |
| 7,724,210 | B2 | 5/2010 | Sprague et al. |
| 8,040,292 | B2 | 10/2011 | Ronzani et al. |
| 8,705,177 | B1 | 4/2014 | Miao |
| 2004/0057138 | A1 | 3/2004 | Tanijiri et al. |
| 2004/0070839 | A1 | 4/2004 | Yagi et al. |
| 2004/0113867 | A1 | 6/2004 | Tomine et al. |
| 2004/0114256 | A1 | 6/2004 | Matsuo |
| 2009/0180194 | A1 | 7/2009 | Yamaguchi et al. |
| 2009/0268287 | A1 | 10/2009 | Buchon et al. |
| 2011/0062461 | A1 | 3/2011 | Yamazaki et al. |
| 2012/0105310 | A1 | 5/2012 | Sverdrup et al. |
| 2012/0139817 | A1 | 6/2012 | Freeman |
| 2012/0154920 | A1 | 6/2012 | Harrison et al. |
| 2014/0266986 | A1 | 9/2014 | Magyari |
| 2014/0266987 | A1 | 9/2014 | Magyari |
| 2014/0320972 | A1 | 10/2014 | Magyari et al. |
| 2014/0320974 | A1 | 10/2014 | Magyari |

FOREIGN PATENT DOCUMENTS

| | | |
|---|---|---|
| EP | 1258771 | 11/2002 |
| EP | 1271188 | 1/2003 |
| GB | 2295938 | 12/1996 |
| JP | 05-080331 | 4/1993 |
| JP | 7-191274 | 7/1995 |
| JP | 08-152591 | 6/1996 |
| JP | H08286140 | 11/1996 |
| JP | 09-090271 | 4/1997 |
| JP | 09-189880 | 7/1997 |
| JP | H09197337 | 7/1997 |
| JP | 09-508711 | 9/1997 |
| JP | H10319240 | 12/1998 |
| JP | H11326823 | 11/1999 |
| JP | 2002504710 | 2/2002 |
| JP | 2004184773 | 7/2004 |
| JP | 2004-234015 | 8/2004 |
| JP | 2004226469 | 8/2004 |
| WO | 95/21395 | 8/1995 |
| WO | 0055676 | 9/2000 |
| WO | 2007003691 | 1/2007 |
| WO | 2011/062591 A1 | 5/2011 |

OTHER PUBLICATIONS

"Vuzix Wrap 920AR" Retrieved from the Internet: URL:http://www.vuzix.com/augmented-reality/products_wrap920ar.html [retrieved on Jan. 15, 2014] (2 pages).

"Vuzix STAR 1200" Retrieved from the Internet: URL:http://www.vuzix.com/augmented-reality/products_star1200.html [retrieved on Jan. 15, 2014] (2 pages).

"Vuzix STAR 1200XL" Retrieved from the Internet: URL:http://www.vuzix.com/augmented-reality/products_star1200xl.html [retrieved on Jan. 15, 2014] (2 pages).

"Vuzix Wrap 1200VR" Retrieved from the Internet: URL:http://www.vuzix.com/consumer/products_wrap_1200vr.html [retrieved on Jan. 15, 2014] (2 pages).

"Vuzix Wrap 1200" Retrieved from the Internet: URL:http://www.vuzix.com/consumer/products_wrap_1200.html [retrieved on Jan. 15, 2014] (2 pages).

"I-Optik" by Inovega, inc. Retrieved from the Internet: URL:http://innovega-inc.com/how-it-compares.php [retrieved on Jan. 15, 2014] (1 page).

English Language Abstract of Japanese Patent Application Publication No. 09-090271 (1 page).

English Language Abstract of Japanese Patent Application Publication No. 05-080331 (1 page).

English Language Abstract of Japanese Patent Application Publication No. 09-189880 (1 page).

English Language Abstract of Japanese Patent Application Publication No. 2004-234015 (1 page).

International Search Report for PCT/US94/09819 (2 pages).

English Language Abstract of Japanese Patent Application Publication No. 08-152591 (1 pages).

Office Action for Japanese Patent Application Publication No. 2012-539860 dated Oct. 15, 2013 (4 pages).

English Translation of Office Action for Japanese Patent Application Publication No. 2012-539860 dated Oct. 15, 2013 (4 pages).

International Preliminary Report on Patentability for International Application No. PCT/US2009/065420 dated May 22, 2012 (8 pages).

International Search Report and Written Opinion for International Application No. PCT/US2009/065420 dated Jan. 19, 2010 (10 pages).

English translation of Office Action for Mexican National Stage Patent Application No. MX/a/2012/005855 dated Feb. 27, 2013 (claiming priority to International Application No. PCT/US2009/065420) (5 pages).

Office Action for U.S. Appl. No. 14/214,346 mailed Mar. 13, 2015 (34 pages).

Notice of Allowance for U.S. Appl. No. 14/213,996 mailed Feb. 4, 2015 (18 pages).

The International Preliminary Report on Patentability and Written Opinion of the International Preliminary Examining Authority for International Application No. PCT/US2014/29714 mailed Mar. 3, 2015 (7 pages).

The International Preliminary Report on Patentability for International Application No. PCT/US2014/29719 mailed Mar. 11, 2015 (8 pages).

The International Preliminary Report on Patentability for International Application No. PCT/US2014/29725 mailed Mar. 10, 2015 (8 pages).

The International Preliminary Report on Patentability for International Application No. PCT/US2014/29708 mailed Mar. 12, 2015 (10 pages).

Office Action for U.S. Appl. No. 14/213,996 mailed Sep. 9, 2014 (9 pgs.).

Office Action for U.S. Appl. No. 14/214,290 mailed Sep. 25, 2014 (10 pgs.).

H. Hoshi, et .al, "Off-axial HMD optical system consisting of aspherical surfaces without rotational symmetry," SPIE vol. 2653, 234 (1996).

S. Yamazaki, et al., "Thin wide-field-of-view HMD with free-form-surface prism and applications," Proc. SPIE, vol. 3639, 453 (1999).

Cakmakci, et al.,"Optimal local shape description for rotationally non-symmetric optical surface design and analysis," Opt. Express 16, 1583-1589 (2008).

D. Cheng, et al., "Design of a lightweight and wide field-of-view HMD system with free form surface prism," Infrared and Laser Engineering, vol. 36, 3 (2007).

The International Search Report and the Written Opinion for International Application No. PCT/US2014/029714 mailed Jun. 17, 2014 (10 pages).

The International Search Report and the Written Opinion for International Application No. PCT/US2014/029719 mailed Jun. 17, 2014 (10 pages).

The International Search Report and the Written Opinion for International Application No. PCT/US2014/029725 mailed Jun. 17, 2014 (13 pages).

The International Search Report and the Written Opinion for International Application No. PCT/US2014/029708 mailed Jun. 17, 2014 (12 pages).

* cited by examiner

HEAD MOUNTED DISPLAY DEVICE

FIELD

This disclosure relates to a head mounted display device for displaying and viewing visual content from a visual display source.

BACKGROUND

A head-mounted display, abbreviated "HMD", is a display device that is worn on a user's head that has either (1) a single small display optic located in front of one of the user's eyes (monocular HMD), or (2) two small display optics, with each one being located in front of each of the user's two eyes (bi-ocular HMD), for viewing a wide range of visual display content by a single user. A bi-ocular HMD allows for the possibility that the user may view visual content in 3-dimensions. The HMD devices that can currently be found in today's military, commercial, and consumer markets are primarily either goggles/eyeglasses type devices that are worn the way a pair of goggles or eyeglasses are worn, or they are helmet-mounted devices that are attached to a helmet that is worn on the user's head. Additionally, the HMD devices that can currently be found in today's market primarily rely on three different technologies, and thus fall into three different categories; refractive, diffractive, and laser writer.

The first category of HMD devices currently found on the market is the refractive HMD. Refractive HMD's use the optical physics principle of refraction in order to transmit the projection of visual content from a visual display source to a user's eye. Refractive HMD's work by transmitting a projection of visual content from a display source through a light transmission medium, typically a transparent plastic such as acrylic, to produce a final coherent and often magnified image to the user's eye. The light transmission medium is essentially a lens or series of lenses that bend and magnify the light waves from the visual source as they enter and exit the transmission medium so as to form the magnified cohesive image, similar to the operation of a magnifying glass. This is the dominant methodology employed in most HMD's on the market today.

While the refractive HMD may be the dominant methodology used in the HMD market, it does have several drawbacks. The problem with such refractive HMD's is that, with the transmission medium typically being large blocks of heavy plastic located in the optical path of the HMD, this type of HMD is very heavy, bulky, and cumbersome for a user to wear on either his head or face. This limits the overall comfort for the user wearing such an HMD. In addition, such a bulkier fit for the user significantly limits the styling that may be applied to such a device. Furthermore, because the refractive lenses of refractive HMD's are often located in the user's direct field of view, creating a refractive HMD that gives a user adequate "see-through vision," or the ability to simultaneously see the projected visual content and at the same time clearly see through the projected content to the real-world outside surrounding environment, a "mixed-reality" view, becomes very complicated. Another drawback of refractive HMD's is that they can often prevent a user from seeing anything other than the projected visual content or can severely limit a user's peripheral vision, which can ultimately leave the user feeling claustrophobic. A further drawback of refractive HMD's is that, for those commonly found in the consumer or commercial markets, they have a very limited field-of-view ("FOV") angle, with the typical FOV being about 25-degrees and the high-end FOV being about 40-degrees. When trying to increase the FOV of refractive HMD's commonly found in the consumer and commercial markets above the typical FOV of 25-degrees, the cost and weight of the device increases dramatically, which can be a significant prohibitive factor in two already competitive markets. This situation is apparent in the military market where refractive HMD's with FOV's between 40-degrees and 120-degrees are much more common, however as previously stated, they are extremely heavy and very expensive.

The second category of HMD devices currently found on the market is the diffractive HMD, or more accurately, a hybrid refractive/diffractive HMD. Diffractive HMD's use the optical physics principle of diffraction and diffraction gratings as well as refraction in order to transmit the projection of visual content from a visual display source to a user's eye. With this type of HMD, the projection of the visual content is passed through both a transmission medium and a diffraction grating contained within one of the refractive transmission medium elements to produce a final coherent and often magnified image to the user's eye. The light waves from the projected visual content that are passing through the transmission medium ultimately pass through the diffraction grating, which serves to present a single coherent image to the user. The main drawback to such hybrid HMD systems is that they require a high intensity light source and therefore they are very inefficient when it comes to power consumption, they consequently require a substantial amount of power to operate at acceptable levels, and they have a significantly reduced display lifetime. Additionally, they have somewhat limited FOV capabilities due to the physics of how diffraction gratings operate.

The third category of HMD devices currently found on the market is the laser-writer HMD. The laser-writer HMD uses a remote laser light engine, often consisting of a triad of red, green, and blue lasers, and a set of laser writers to bend and beam the laser lights, according to an input visual display signal, into a coherent visual image. The lasers and laser writer are connected to a head mounted display unit by coherent fiber optic cable in order to transmit the images to the head mounted unit. The images are then projected from the coherent fiber optic cable onto the final viewing screen, typically a transparent lens in the HMD unit, for viewing by the user. One drawback associated with this type of HMD is that the coherent fiber optic cable required for such a system is very expensive. Another downside to such HMD systems is that, as the image comes out of the fiber optic cable, the head unit will still need some type of refractive optic to magnify the image, which in turn translates to a limited FOV and increased weight of the head unit. Furthermore, another downside related to laser-writer HMD's becomes apparent when using such a system to view visual content in 3D. To do so, the HMD system would either be required to beam two distinct images to the head unit at the same time over a single fiber optic cable, thus requiring the head unit to incorporate a beam splitter to separate the two images for each eye, or the HMD system would require a second laser system working simultaneously with the first laser system in order to produce the second image necessary to deliver 3D visual content. In either case, this can become extremely expensive. An additional downside to the laser-writer HMD device is that the power consumption necessary to run such a device is extremely high. Lastly, transmitting an image to the head mounted unit via fiber optic cables can be potentially problematic if care is not taken to observe the required minimum bend radius of the fiber optic cable. If the cable is bent at too tight a radius, this will result in significant signal losses.

None of the three categories of HMD systems that are available today are capable of providing magnified coherent visual content for viewing by a user from a single device that is all at once inexpensive, lightweight, comfortable, and that can be considered a near-to-eye HMD device. Consequently, because of the shortcomings and problems associated with the three types of systems currently available, there is a need in the industry for a new type of HMD device that is fairly inexpensive, lightweight, compact, comfortable, and is a near-to-eye device.

SUMMARY

Described herein is a primarily reflective-based head mounted display device for displaying and viewing visual content from a visual display source.

According to the present disclosure, the reflective head mounted display device includes a frame and at least one near-to-eye optics housing connected to the frame. The optics housing and frame are configured so that the optics housing may be positioned at least partially in front of an eye of a user. The optics housing includes a light-emitting visual source located within the optics housing for projecting visual content. The optics housing also includes a plurality of reflective optical surfaces disposed within the optics housing that are configured to reflect a projection of the visual content from the visual source into the eye of the user.

Accordingly, the present disclosure is primarily and substantially a reflective-based head mounted display device as opposed to a primarily refractive, diffractive, or laser-writer-based head mounted display device. In this manner, the present disclosure may optionally be a fully refractor-less head mounted display device. By primarily using a plurality of reflective optical surfaces to transmit the visual content to an eye of a user, the device may use air as the transmission medium through which the reflections pass, as opposed to heavy transparent plastic. This aspect of the present disclosure has the benefit of making the device significantly more lightweight than any other device available. It also has the benefit and distinction of being the first operational, near-to-eye, primarily reflective-based head mounted display device ever developed, as previous industry efforts to develop such a reflective-based device have been unsuccessful. Another benefit of the present disclosure is that, because the device is primarily reflective-based, the reflectors may be sized and positioned such that all of the reflectors required to project visual content from a visual display source to a user's eye may be contained within a relatively small optics housing that is kept near-to-eye. Such a compact device eliminates the need for substantial and expensive remote systems, such as is necessary for laser-writer-based devices.

In another aspect of the present disclosure, the frame is a wearable, head mounted frame and the optical surfaces are configured to cooperatively magnify the projection of the visual content so that the visual content appears larger than the actual size of the visual source from which it is being projected. In addition, the device may include a first near-to-eye optics housing connected to the frame that is configured to be positioned in front of a first eye of a user, as well as a second near-to-eye optics housing connected to the frame that is configured to be positioned in front of a second eye of the user. In this manner, a bi-ocular head mounted display is achieved.

In another aspect of the present disclosure, the optics housing also includes a substantially opaque primary transmission housing that is connected to a substantially transparent secondary vision housing. The secondary vision housing is positioned in front of the eye of the user and is designed to allow a user to see there through. It includes a front dust cover and a outer dust cover that are both transparent. The secondary vision housing has a variably-adjustable transmission-loss layer in communication with the outer dust cover. This transmission-loss layer allows for the selectable adjustment of the amount of transmission-loss of any light passing there through. Accordingly, a user may adjust the layer so that it is fully transparent to allow viewing of the all of the light passing there through, is completely dark or opaque to prevent viewing of the light passing there through, or has varying levels of darkness to allow partial viewing of the light passing there through.

In another aspect of the present disclosure, the plurality of reflective optical surfaces includes a series of reflective optical surfaces including a first reflective optical surface, at least one intermediate optical surface, and a last reflective optical surface. The last reflective optical surface may be an interior surface of the outer dust cover. The visual content is projected from the visual source to the first reflective optical surface. The visual content is then reflected to at least one intermediate optical surface, next reflected to the last reflective optical surface, which is the interior surface of the outer dust cover, and lastly reflected into the user's eye. The user can selectably choose to view only the visual content by making the adjustable transmission-loss layer, located behind the last reflective optical surface, completely dark, thus blocking out his view of the outside surroundings through the outer dust cover of the secondary vision housing. Alternatively, the user may selectably choose to have "see-through vision" and view both the visual content and the real time outside surrounding environment at the same time, a "mixed-reality" view, by setting the adjustable transmission-loss layer to have only partial darkness or opacity. In this manner, the user would then see the reflection of visual content overlaid onto their real world view of the outside surrounding environment.

Other embodiments, objects, features and advantages will be set forth in the detailed description of the embodiments that follows, and in part will be apparent from the description, or may be learned by practice, of the claimed invention. These objects and advantages will be realized and attained by the processes and compositions particularly pointed out in the written description and claims hereof. The foregoing Summary has been made with the understanding that it is to be considered as a brief and general synopsis of some of the embodiments disclosed herein, is provided solely for the benefit and convenience of the reader, and is not intended to limit in any manner the scope, or range of equivalents, to which the appended claims are lawfully entitled.

DETAILED DESCRIPTION

Figure 1:
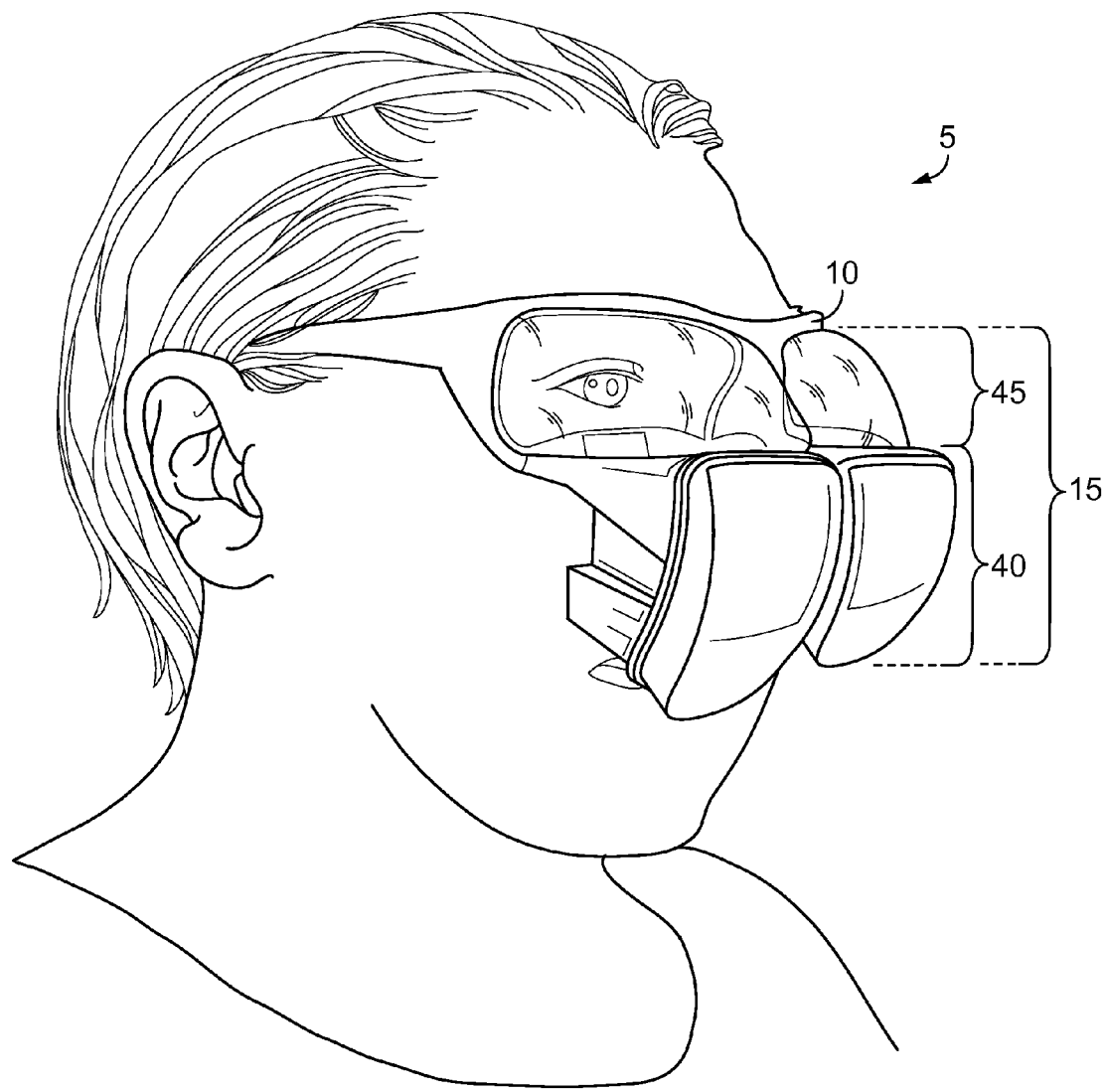
FIG. 1 is a perspective view of a user wearing a bi-ocular embodiment of the primarily reflective-based head mounted display device.

While the present invention is capable of embodiment in various forms, there is shown in the drawings, and will be hereinafter described, one or more presently preferred embodiments with the understanding that the present disclosure is to be considered as an exemplification of the invention, and is not intended to limit the invention to the specific embodiments illustrated herein. Headings are provided for convenience only and are not to be construed to limit the invention in any way. Embodiments illustrated under any heading may be combined with embodiments illustrated under any other heading.

HMD Device Construction

Figure 2:
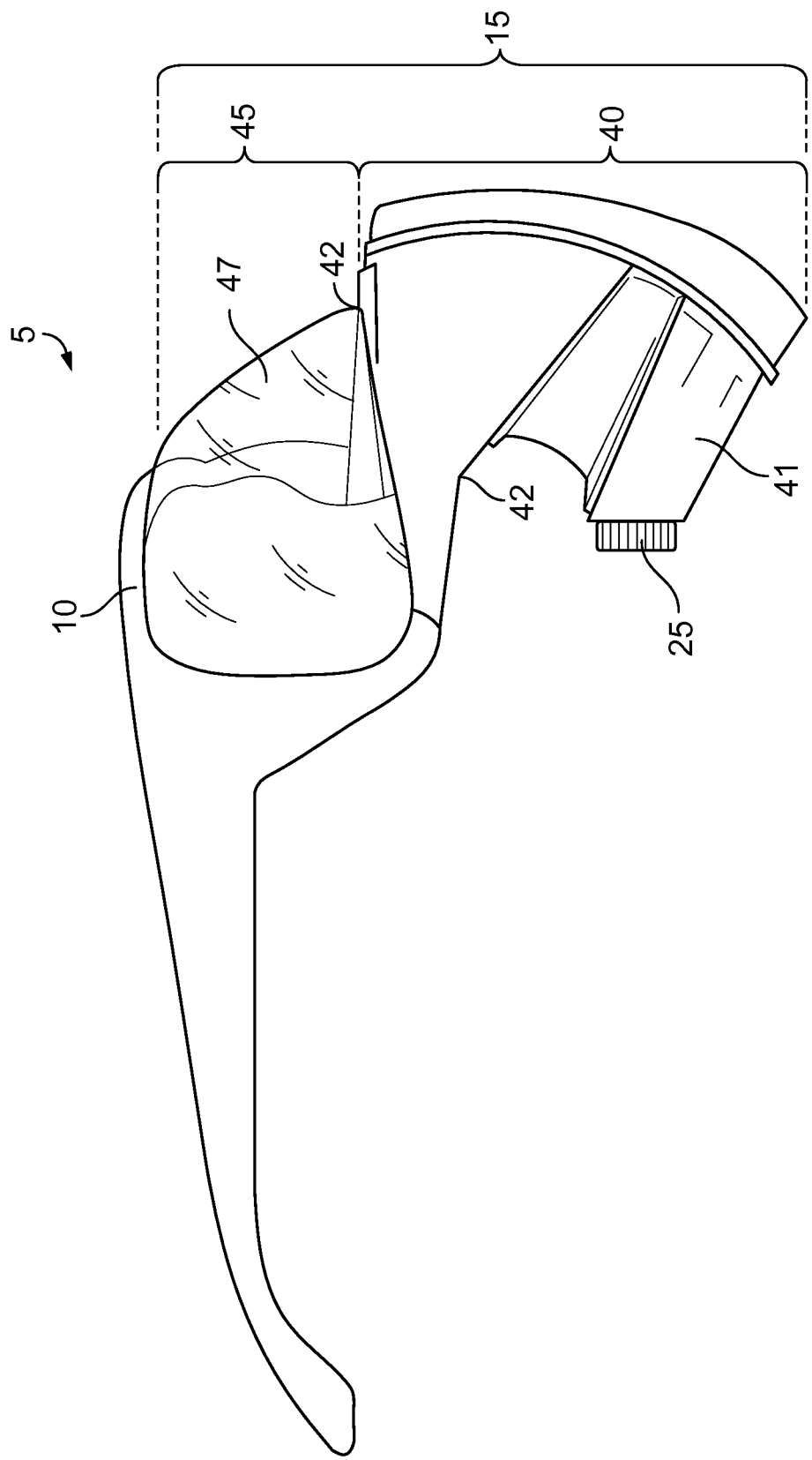
FIG. 2 is a side view of an embodiment of the primarily reflective-based head mounted display device.
Figure 5:
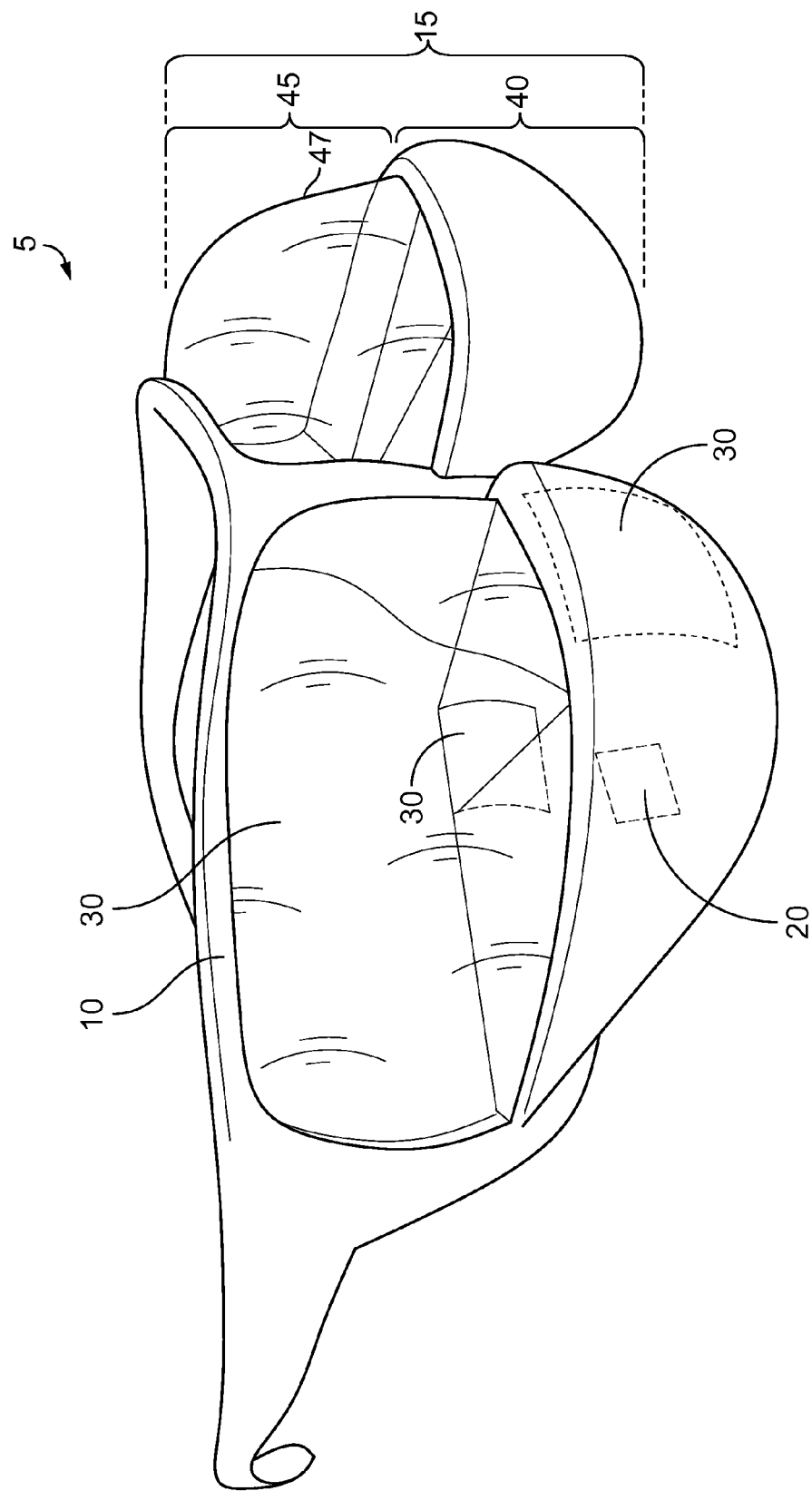
FIG. 5 is a perspective view of an alternate bi-ocular embodiment of the primarily reflective-based head mounted display device that utilizes three reflective optical surfaces.

Referring to FIGS. 1, 2 and 5, a primarily reflective-based head mounted display ("HMD") device 5 for displaying and viewing visual content from a display source is disclosed. The HMD device 5 includes a frame 10 and at least one near-to-eye optics housing 15 connected to the frame 10.

In the preferred embodiment, the frame 10 is a wearable, head mounted frame such as that of an eyeglasses frame. However, the disclosure of this embodiment should not be read to limit the shape of the frame 10. Accordingly, in alternate embodiments the frame 10 may be of any type that can be configured to be mounted to a helmet or mounted to any other similar type of head wearable device, such as a head band or adjustable head strap. The frame 10 is connected to the near-to-eye optics housing 15 and is configured to support the weight of the near-to-eye optics housing 15. The frame is also configured such that the optics housing 15 may be positioned at least partially in front of an eye of a user and in the HMD user's line of sight when properly worn.

In the preferred embodiment, the frame 10 is connected to two optics housings wherein a first optics housing 15 can be placed at least partially in front of a user's first eye and a second optics housing 15 can be placed at least partially in front of a user's second eye. The first and second optics housings 15 may be physically identical, mirror images of each other, or other combinations of size and shape as may be desired. This embodiment is considered a "bi-ocular" HMD device because it is a device that utilizes two separate channels (i.e. the two separate optics housings 15) to provide separate visual content to each of a user's two eyes. Bi-ocular HMD devices can allow a user to view 2-dimensional visual content either by providing the exact same visual content over both channels to both of the user's eyes at the same time (e.g. similar to watching a television), or by providing a first visual content over a first channel to a users' first eye and providing completely different second visual content over the second channel to a user's second eye (i.e. like having each eye watch a separate television with each television showing different programs), or lastly by providing visual content over a first channel to only a user's first eye and not providing any content to the user's second eye. Alternatively, bi-ocular devices can allow a user to achieve 3-dimensional stereoscopic vision (i.e. binocular vision) by providing each eye with a slightly different version of the same visual content. However, the disclosure of this embodiment should not be read to limit the HMD device 5 to only devices having two optics housings 15. Accordingly, in an alternate embodiment (not shown), the frame 10 may be connected to only one optics housing 15, wherein the frame 10 and optics housing 15 are then configured such that the one optics housing 15 can be placed partially in front of a user's first eye. The device of this alternate embodiment is considered a "monocular" HMD device because it is a device that utilizes a single channel (i.e. one optics housing 15) for only one of a user's two eyes.

In yet another alternate embodiment (not shown), the frame 10 and optics housings 15 may be configured such that the optics housings 15 are selectably attachable/detachable from the frame 10, thus allowing the user to choose whether to utilize a monocular HMD device, having only one optics housing 15 for a single eye, or a bi-ocular HMD device, having two optics housings 15, one for each of the user's eyes. In still another alternate embodiment (not shown), the optics housings 15 may be hingeably connected to the frame 10 such that the optics housings 15 can be selectably rotated about a hinge to remove the optics housings 15 from a location in front of the user's eyes and remove them from the user's line of sight.

The frame 10 is comprised of at least one durable, lightweight material such as a magnesium alloy, aluminum alloy, titanium, or any other similar lightweight metal based material that has the physical properties of being very lightweight yet very durable. However, the disclosure of the aforementioned materials should not be read to limit the lightweight materials to only metal-based materials. Accordingly, in alternate embodiments the frame 10 may be comprised of a durable lightweight material such as polycarbonate, PVC, polyethylene, nylon, or any other polymer based material that has the physical properties of being very lightweight yet very durable.

Figure 3:
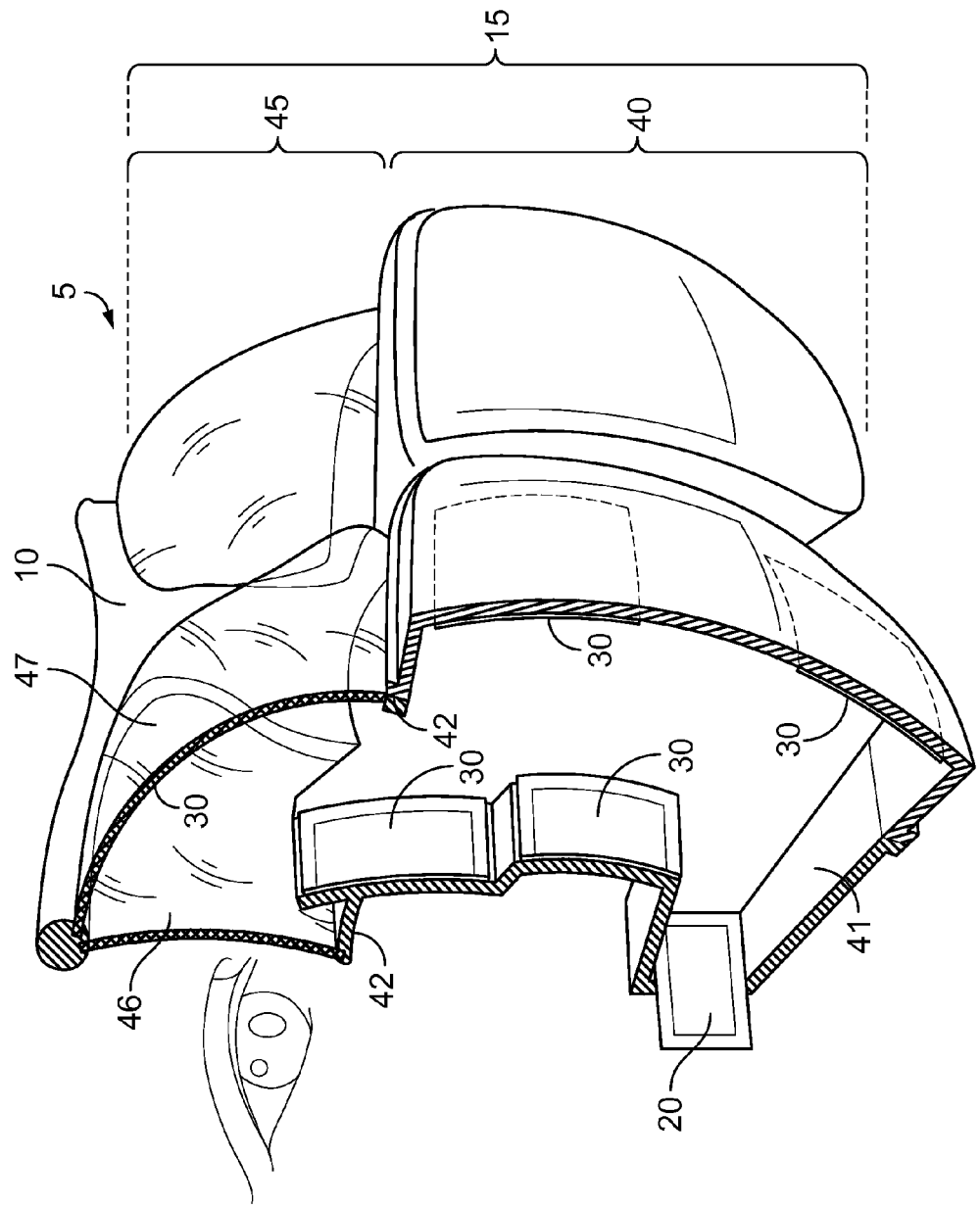
FIG. 3 is a perspective section-view of a bi-ocular embodiment of the primarily reflective-based head mounted display device that utilizes five reflective optical surfaces.

Referring to FIGS. 3 and 5, each near-to-eye optics housing 15 includes a light-emitting visual source 20 for projecting visual content, a plurality of reflective optical surfaces 30, a primary transmission housing 40, and a secondary vision housing 45.

The light-emitting visual source 20 is an electronic device that presents information in visual form that is capable of being viewed by an observer. In a preferred embodiment, the light-emitting visual source 20 is a micro-display connected to a power source, wherein the micro-display includes a source input for accepting input signals from an external source, which are to be output in visual form. However, the disclosure of the aforementioned embodiment should not be read to limit the type of light-emitting visual source(s) that may be utilized in the practice of the matter disclosed herein. Accordingly, in alternate embodiments, the light-emitting visual source 20 can be a laser writer, micro-projector, or any other device or system that is capable of displaying visual content. Furthermore, the light-emitting visual source 20 may receive the input signals from the external source via conventional wires or cables, fiber optics, wireless signal transmission, or any other similar way of transmitting signals known to those skilled in the art of signal and data transmission.

Visual content to be projected includes both static and dynamic visual content, and any additional content that can be visually displayed and is capable of being viewed. Static visual content includes content that does not change over the time during which it is displayed and includes but is not limited to photos, still imagery, static text and graphic data displays that do not update with new information. Dynamic visual content includes content that does change over the time during which it is displayed and includes but is not limited to video playback or real time video, changing imagery, dynamic text and graphic data displays that update as new information is obtained.

The plurality of reflective optical surfaces 30 are surfaces that have a highly polished or smooth surface finish, such as that of a mirror, polished metal, or smooth glass for example, and use the optical physics principal of reflection in order to cast back light waves that are incident upon them. The plurality of reflective optical surfaces 30 are in optical communication with the light-emitting visual source 20 and are configured to cooperatively reflect a clearly focused projection of the visual content from the light-emitting visual source 20 into the eye of the user.

Figure 3A:
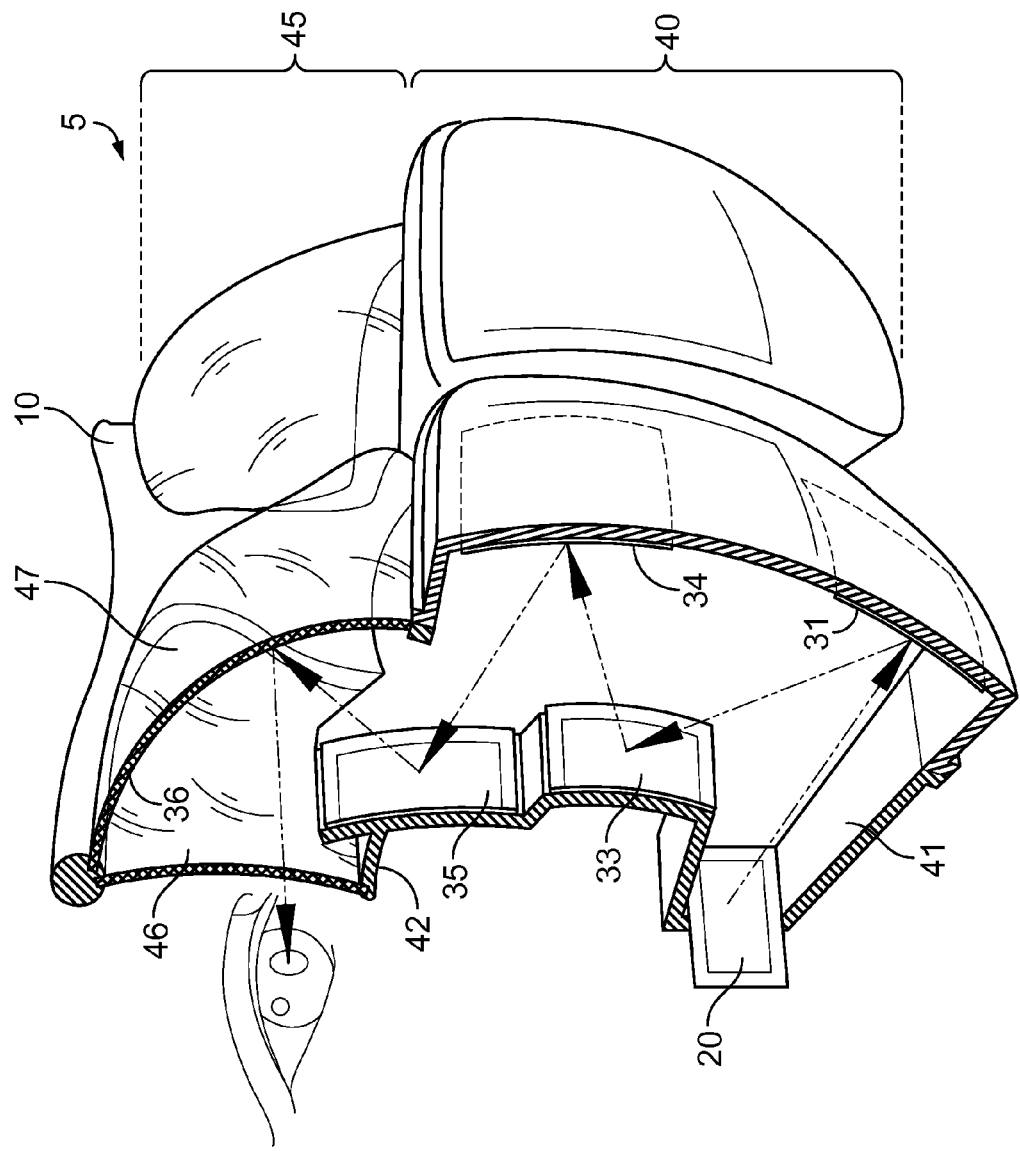
FIG. 3A is a perspective section-view of a bi-ocular embodiment of the primarily reflective-based head mounted display device illustrating an embodiment of the path of reflection from the light-emitting visual source to a user's eye in a five-reflector system.
Figure 6:
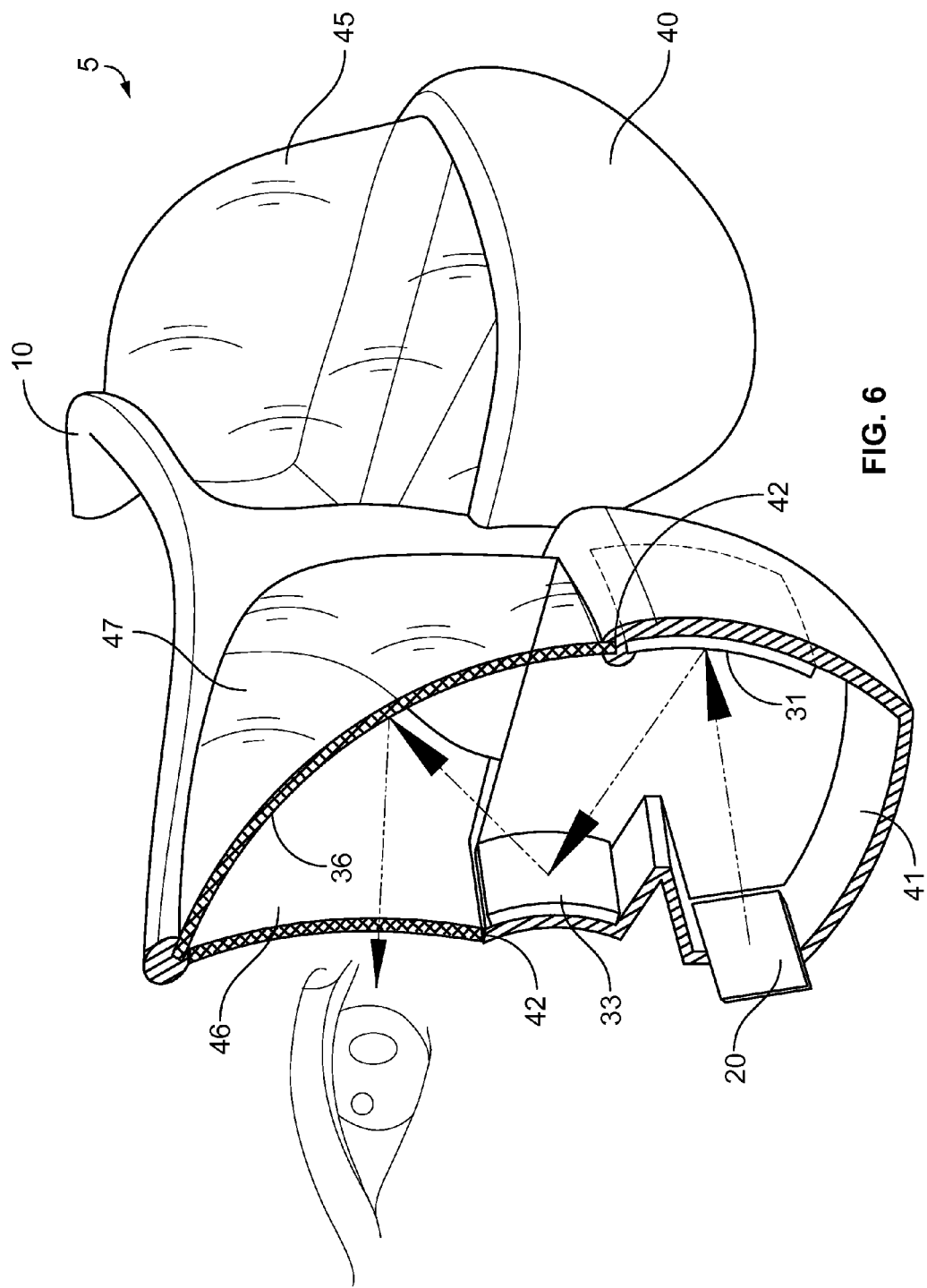
FIG. 6 is a perspective section-view of a bi-ocular embodiment of the primarily reflective-based head mounted display device illustrating an embodiment of the path of light reflection from the light-emitting visual source to a user's eye in a three-reflector system.

Referring to FIGS. 3A and 6, in the preferred embodiment, the plurality of reflective optical surfaces 30 are a combination of separate concave and convex surfaces and include at least a first reflective optical surface 31 and a last reflective optical surface 36. The first reflective optical surface 31 is the reflective optical surface into which the visual content is first projected from the light-emitting visual source 20. The last reflective optical surface 36 is the reflective optical surface from which the visual content is last reflected into the user's eye. Preferably, the plurality of reflective optical surfaces 30 also include at least one intermediate reflective optical surface 32. These concave and convex reflective optical surfaces 30 are additionally configured to cooperatively magnify the projection of the visual content when the projection is reflected off of each reflective optical surface 30, so that the projected visual content 55 appears magnified and in focus when viewed by the HMD device user's eye. However, the disclosure of the aforementioned embodiment utilizing a combination of separate concave and convex surfaces should not be read to limit the scope of the shape of reflective optical surfaces that may be used in an HMD device as disclosed herein. In alternate embodiments, the HMD device 5 may utilize solely convex reflective optical surfaces, solely concave reflective optical surfaces, or other unique geometries without departing from the scope of the disclosure herein. Furthermore, although the disclosure of the aforementioned embodiments has thus far been directed to HMD's utilizing only a plurality of reflective optical surfaces 30 to reflect the visual content projected from the visual source 20 to a user's eye, alternate embodiments may include additional optical elements incorporated into the optical path without departing from the scope of the disclosure to a primarily reflective-based HMD. Accordingly, in alternate embodiments, in addition to including a plurality of reflective optical surfaces 30, one or more refractive elements (not depicted) may be located in the optical path between the light-emitting visual source 20 and the user's eye, in order to manipulate the light waves that will pass there through. In this regard, a hybrid reflective/refractive HMD is created.

Figure 4:
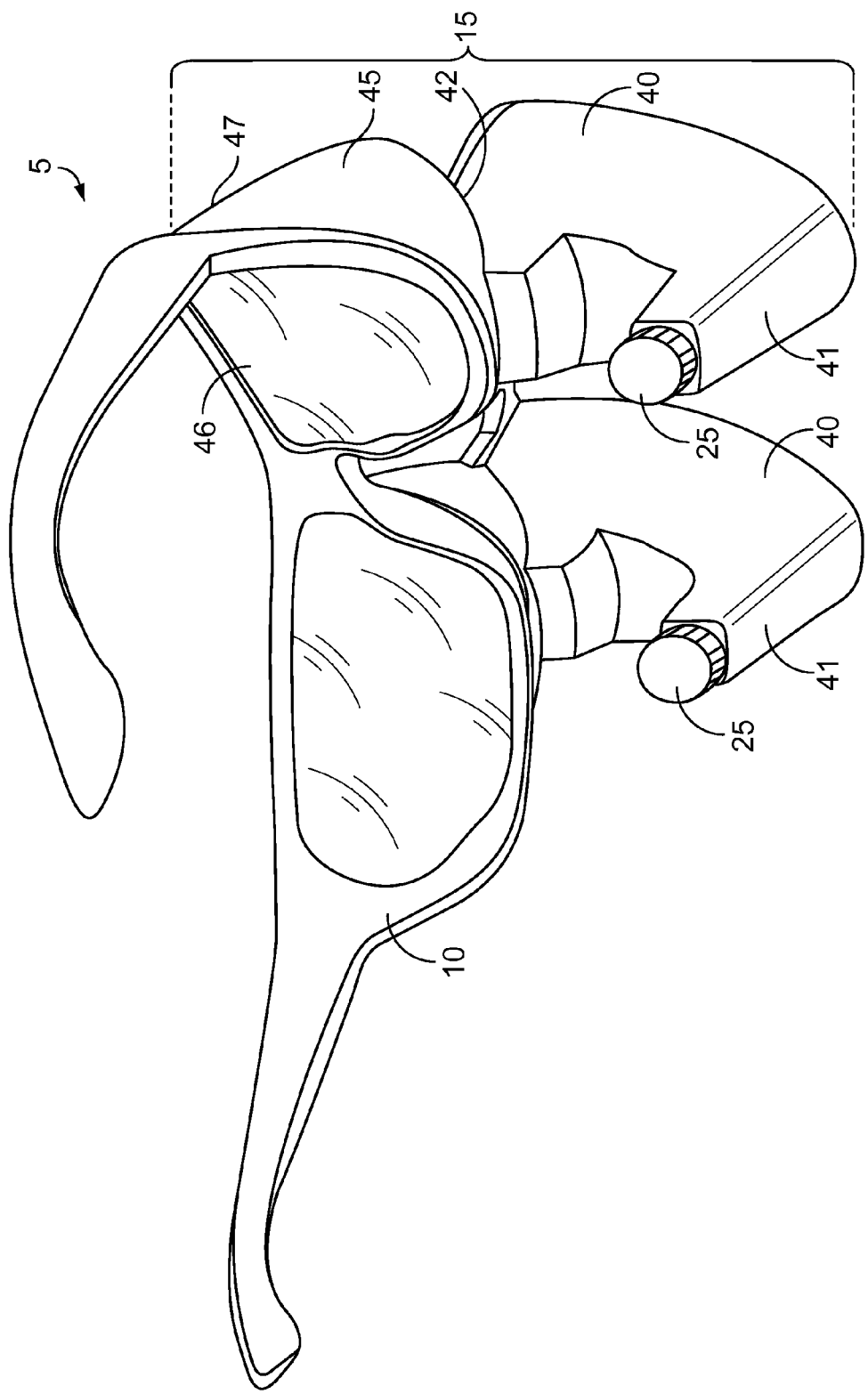
FIG. 4 is a rear perspective view of an embodiment of the primarily reflective-based head mounted display device.

Referring to FIGS. 2 and 4, each near-to-eye optics housing 15 includes, or has connected thereto, a diopter adjuster 25 that is in communication with the light-emitting visual source 20. The diopter adjuster 25 is configured to physically move the position of the light-emitting visual source 20 either forward or backward, in a direction that is substantially parallel to the direction of visual content projection emanating from the light-emitting visual source 20. In doing so, the light-emitting visual source 20 will move either closer to or further away from the fixed location of the first reflective optical surface 31. This results in a corresponding adjustment to the final focal point of the projected visual content within the user's eye. Accordingly, the diopter adjuster 25 is able to provide prescription focus correction and adjust the focus of the visual content that is projected to the user's eye over a fixed prescription range.

Referring again to FIGS. 1 through 6, the primary transmission housing 40 is a chamber of the near-to-eye optics housing 15 in the HMD device 5 in which the projection of the visual content from the light-emitting visual source 20 originates, and in which the majority of the optical reflection and magnification of the projected visual content occurs. In one embodiment, the primary transmission housing 40 is a substantially opaque, hollow chamber that has the light-emitting visual source 20 and diopter adjuster 25 disposed at a first end 41 thereof. The primary transmission housing 40 may further contain each of the plurality of reflective optical surfaces 30 except for the last reflective optical surface 36, disposed at various positions inside of the primary transmission housing 40. More specifically, the plurality of reflective optical surfaces 30 are disposed, in part, either directly on the front and rear internal walls of the primary transmission housing 40, or on support structures located on the front and rear interior walls of the primary transmission housing 40. In the preferred embodiment, the primary transmission housing 40 is connected to and supported by the frame 10. However, the disclosure of the aforementioned embodiment should not be read to limit the structure of the primary transmission housing 40 to only being a substantially opaque or hollow chamber. In alternate embodiments, the primary transmission housing may be an open sided structure or an open skeletal framework that simply serves to support the reflective optical surfaces 30, the light-emitting visual source 20, and diopter adjuster 25 in their appropriate locations, but that does not prevent outside incident light from entering into the reflective path of the reflective optical surfaces 30.

The primary transmission housing 40 is comprised of at least one durable, lightweight material such as a magnesium alloy, aluminum alloy, titanium, or any other similar lightweight metal based material that has the physical properties of being very lightweight yet very durable. However, the disclosure of the aforementioned materials should not be read to limit the lightweight materials to only metal-based materials. Accordingly, in alternate embodiments the primary transmission housing 40 may be comprised of a durable lightweight material such as polycarbonate, PVC, polyethylene, nylon, or any other polymer based material that has the physical properties of being very lightweight yet very durable. Furthermore, with regard to the position of the primary transmission housing, in the preferred embodiment, the primary transmission housing is configured to be substantially located below the frame 10 and the user's eye, and adjacent to the user's face. However, in alternate embodiments, the primary transmission housing 40 may be configured to be substantially located along the length of any earpiece associated with the frame 10, adjacent to a side of the user's face, above the frame 10, above the user's eye, adjacent to the user's forehead, or at any other location as needed that allows the HMD device disclosed herein to function according to the teachings disclosed herein.

Referring to FIGS. 2-4 and 6, the secondary vision housing 45 is connected to the primary transmission housing 40 at a second, open end 42 of the primary transmission housing 40, opposite the first end 41 in which the light-emitting visual source 20 is located. The secondary vision housing 45 is the portion of the optics housing 15 that is placed at least partially in front of the HMD device user's eye. In a preferred embodiment the secondary vision housing 45 is also integrally connected to the both the frame 10 and the primary transmission housing 40. However, the disclosure of the aforementioned embodiment should not be read to limit the secondary vision housing 45 to being integrally connected to either the frame 10 or the primary transmission housing 40. In an alternate embodiment, the secondary vision housing 45 can be detachably or hingeably connected to and supported by the primary transmission housing 40.

Referring to FIGS. 3-4 and 6, the secondary vision housing 45 includes a transparent front dust cover 46 that is configured to be positioned directly in front of the user's eye and in the user's line of sight. The front dust cover 46 is preferably optically neutral, in that it does not act like a traditional prescription lens. Rather, the front dust cover 46 allows light waves from any visual object being viewed by the user to pass through it without any noticeable distortion, alteration, or bending thereof. Furthermore, the front dust cover 46 is preferably comprised of a durable transparent material such as polycarbonate, glass, acrylic, or any other similar material that is both transparent and durable.

The secondary vision housing 45 also includes an outer dust cover 47, which is substantially a shell located adjacent to the front dust cover 46. The outer dust cover 47 is configured to be positioned in front of the front dust cover 46 and positioned in the user's same line of sight as the front dust cover 46. Together, the front dust cover 46 and outer dust cover 47 of the secondary vision housing 45 serve to close off the open, second end 42 of the primary transmission housing 40, and thus substantially seal the optics housing 15 so as to prevent dust or any other environmental contaminants from entering the optics housing 15 and interfering with the reflective optics.

Figure 9A:
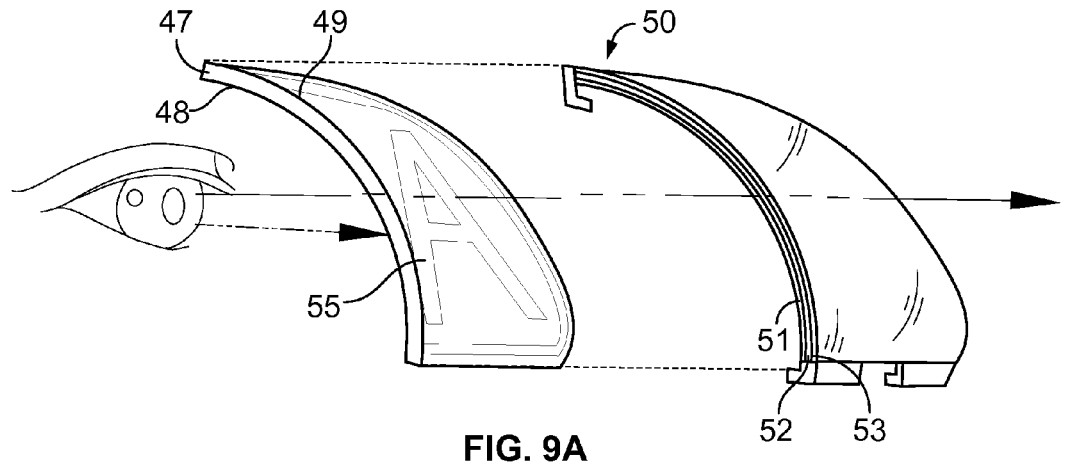
FIGS. 9A-9C are a progression of a perspective exploded views of an embodiment of the last reflective optical surface in communication with an embodiment of an adjustable transmission-loss layer, wherein the adjustable transmission-loss layer has increasing darkness or opacity levels in each of FIGS. 9A through 9C.
Figure 9B:
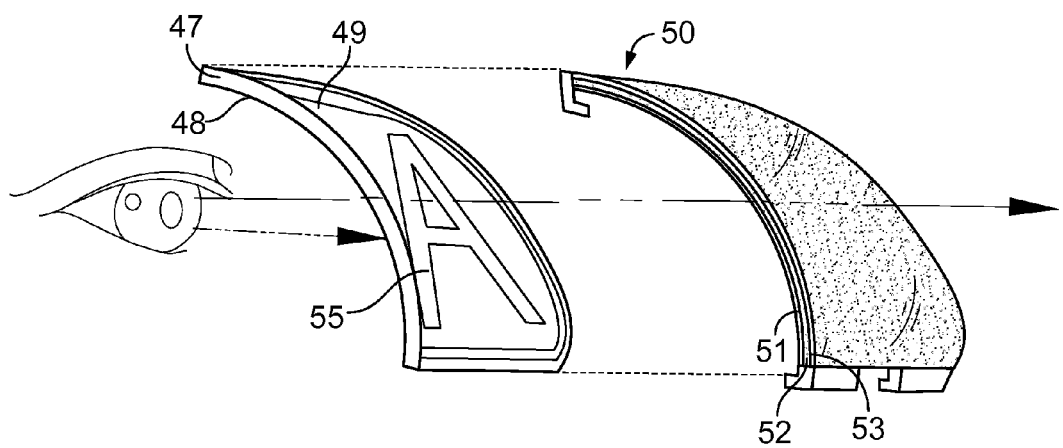
Figure 9C:
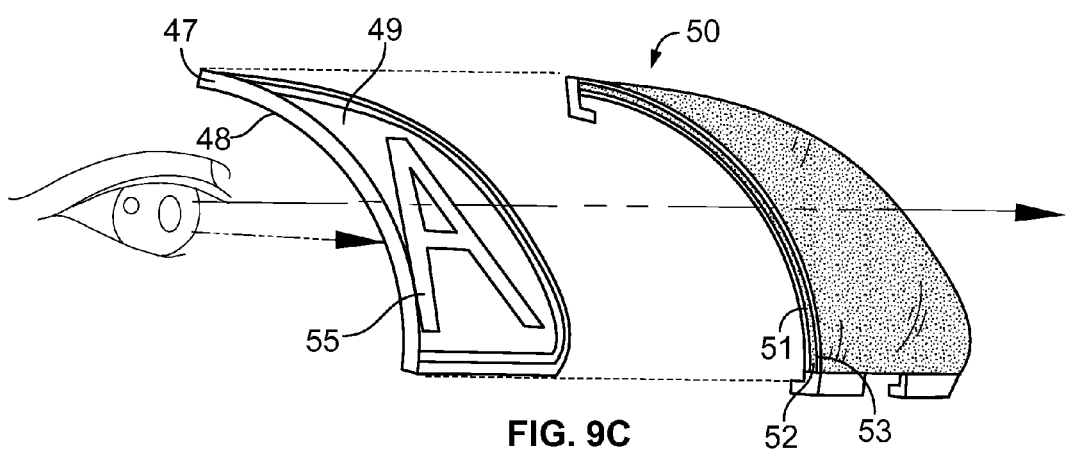

Referring to FIGS. 9A-9C, the outer dust cover 47 includes a concave, interior surface 48 that is configured to be the last reflective optical surface 36 among the plurality of reflective optical surfaces 30. As previously disclosed, this interior surface 48 is the reflective optical surface 36 from which the projected visual content 55 is last reflected into the user's eye. In the preferred embodiment the outer dust cover 47 is a substantially transparent, curved shell that is in communication with a variably-adjustable transmission-loss layer 50. In this embodiment, the outer dust cover 47 is comprised of a durable transparent material such as polycarbonate, glass, acrylic, or any other similar material that is both transparent and durable. Furthermore, the outer dust cover 47 may optionally be designed to have a material thickness sufficient to achieve at least the minimum requirements for providing ballistic protection in optical devices. However, the disclosure of the aforementioned embodiment should not be read to limit the outer dust cover 47 to being only a basic transparent or substantially transparent passive shell. In alternate embodiments (not shown), the outer dust cover 47 may be a switchable mirror or a reversible electrochromic mirror or any other similar such technology that allows for selective mirroring or adjusting of the reflectance of the outer dust cover 47.

In an additional alternate embodiment, the substantially transparent outer dust cover 47 may also be a "partial mirror," in that the otherwise transparent outer dust cover 47 has a partially mirrored interior surface 48, and thus a partially mirrored last reflective optical surface 36. This partially mirrored interior surface 48 has a fixed minimum reflectance value associated therewith. The reflectance value is a ratio, expressed as a percentage, of the total amount of radiation, as of light, reflected by a surface, to the total amount of radiation initially incident on the surface. Having a partial mirror as the interior surface 48 of the outer dust cover 47, and thus the last reflective optical surface 36, allows the HMD designer to increase the minimum reflectance value of the reflective optical surface above that which would otherwise be achievable with the use of only an untreated, transparent outer dust cover 47. In such an embodiment, a partial mirror may be created by having the interior surface 48 of the otherwise transparent outer dust cover 47, as disclosed above, treated or coated with a thin deposit of a reflective material (i.e. aluminum, silver, gold, etc.) in order to enhance the interior surface's 48 reflectance and create a minimum fixed reflectance value for the last reflective optical surface 36. By selecting the proper type and thickness of the reflective material that is to be deposited on the last reflective optical surface 36, a partial mirror having the desired minimum reflectance value may be accurately achieved. In one embodiment, a partial mirror may have a minimum reflectance in a range of about 1-10%, 11-20%, 21-30%, 31-40%, 41-50%, 51-60%, 61-70%, 71-80%, 81-90%, or 91-99%.

Because the substantially transparent outer dust cover 47 of the preferred embodiment is a curved shell having a concave interior surface 48, the outer dust cover 47 acts as a refractive lens that distorts the user's view of the surrounding environment when viewed there through. Accordingly, an exterior surface 49 of the outer dust cover 47 has a separate corrective refractive lens shape (not shown) formed thereon that counteracts this distortion to result in an outer dust cover 47 that is optically neutral with no noticeable distortional effects occurring to the light waves that pass there through.

Referring again to FIGS. 9A to 9C, in the preferred embodiment, the variably-adjustable transmission-loss layer 50 in communication with the outer dust cover 47 can selectably be made to have varying levels of darkness or opacity, ranging from completely dark or fully opaque to fully transparent. In one embodiment, the adjustable transmission-loss layer 50 may comprise at least three distinct layers 51, 52, 53, wherein a flexible and adjustable liquid crystal layer 52 is laminated or located between two protective layers 51, 53 (see FIGS. 9A to 9C). This sandwich of three layers can be removably attached to either the exterior surface 49 or interior surface 48 of the outer dust cover 47 and the darkness of liquid crystal layer may be adjusted to allow for various levels of transmission-loss of the light that passes there through.

However, the disclosure of the aforementioned embodiment should not be read to limit the adjustable transmission-loss layer 50 to being a separate removable layer that can be attached to the outer dust cover 47. In alternate embodiments, the adjustable transmission-loss layer 50 may be integrally associated with the outer dust cover 47. In such an embodiment, the outer dust cover 47 may comprise at least two separate layers, wherein the adjustable transmission-loss layer 50 is a flexible and adjustable liquid crystal layer that is laminated or located between two of the layers of the outer dust cover 47. In yet another alternate embodiment, the adjustable transmission-loss layer 50 may be integrally associated with the exterior surface 49 or interior surface 48 of the outer dust cover 47. Additionally, the disclosure of the aforementioned embodiments should not be read to limit the adjustable transmission-loss layer 50 to only using liquid crystal technology. In alternate embodiments the adjustable transmission-loss layer 50 may utilize any type of technology or be any type of layer that is capable of attaining adjustable levels of transmission-loss, such as switchable mirrors or reversible electrochromic mirrors.

In addition, because the front dust cover 46 and outer dust cover 47 of the preferred embodiment are substantially transparent, the user has the ability to see through both the front dust cover 46 and the outer dust cover 47, so as to view both the user's real-world surrounding environment and, at the same time, view the projected visual content 55 overlaid onto the user's view of the real-world surrounding environment. This provides the user with "see-through vision" in which the user simultaneously sees a mixed-reality view of both the visual content 55 and the surrounding environment. If the user wants a brighter view of the projected visual content 55, he can increase the level of darkness or opacity associated with the adjustable transmission-loss layer 50 further towards the dark or opaque end of the scale, which in turn will increase the transmission-loss of outside light passing through the layer to the user's eyes, and darken the view of the surrounding environment that the user is able to see. If the user makes the adjustable transmission-loss layer 50 completely dark or opaque, he will only be able to see the projected visual content 55, and the outside environment will be completely blocked out. If, however, the user adjusts the adjustable transmission-loss layer 50 to be fully transparent, the user will still be able to see a faint projection of the visual content 55 while having a bright view of the surrounding environment. In the preferred embodiment in which the outer dust cover 47 is an untreated, transparent outer dust cover and the adjustable transmission-loss layer 50 is adjusted to be fully transparent, the user will view the surrounding environment at full brightness. However, in embodiments in which the outer dust cover 47 is a partial mirror, the surrounding environment will appear slightly darker than it is in reality due to transmission-loss from the partial mirror preventing all of the light from the surrounding environment from passing through the outer dust cover 47 to the user's eye. One additional way to adjust the brightness of the projected visual content 55 as seen by the user is to either brighten or dim the output of light-emitting visual source 20.

In an alternate embodiment, the adjustable transmission-loss layer 50 could simply be removed altogether and replaced with a set of darkened filters having a fixed level of transmission-loss, similar to sunglasses, that are attached to the exterior surface of the outer dust cover 49. These filters would allow only a fixed percentage of incident light to pass there through. In yet another alternate embodiment, there may be no adjustable transmission-loss layer 50 at all and the outer dustcover 47 itself may be a substantially transparent set of darkened filters. In this embodiment, the brightness of both the projected visual content 55 and the surrounding environment in the mixed-reality view may be determined primarily by the color and/or shade of the transparent material from which the transparent outer dust cover 47 is made. If, for example, the transparent outer dust cover were charcoal in color, then this would result in some transmission-loss of outside light passing through the outer dust cover 47. In this case the projected visual content would appear brighter while the view of the surrounding environment would appear darker than if the outer dust cover 47 were a colorless transparent material.

Furthermore, in any of the aforementioned embodiments in which the front dust cover 46 and outer dust cover 47 are both transparent or allow a user to view the real-world surrounding environment, the secondary vision housing 45 may be configured to allow a prescription lens (not shown) to be attached thereto for providing a user with prescription focus correction if needed to clearly view the surrounding environment there through. In an alternate embodiment, the front dust cover 46 of the secondary vision housing 45 may be a permanent prescription lens, specific to the prescription focus correction needs of the user, for when the user is viewing the surrounding environment there through.

In yet another alternate embodiment, the outer dust cover 47 can be a permanent and substantially opaque shell preventing the user from seeing the surrounding environment there through. In this manner the user can only view the reflection of the projected visual content that is reflected off of the interior surface 48 of the outer dust cover 47, which is also the last reflective optical surface 36. Furthermore, in this alternate embodiment, no corrective lens shape need be formed in the exterior surface 49 of the outer dust cover 47, because it is not possible to see through the outer dust cover 47.

Referring to FIG. 3A, as previously disclosed, the HMD device 5 includes a first 31 and a last 36 reflective optical surface, and preferably includes at least one intermediate reflective optical surface 32. Additionally, as stated previously, the HMD device 5 may optionally include one or more refractive optical elements (not depicted). In a preferred embodiment, the HMD device 5 is a device that has a total of five reflective optical surfaces, with the at least one intermediate reflective optical surface 32 comprising a second 33, a third 34, and a fourth 35 reflective optical surface. In this preferred embodiment, the first 31 and third 34 reflective optical surfaces are concave surfaces, the second 33 and fourth 35 reflective optical surfaces are convex surfaces, and each of the first 31, second 33, third 34, and fourth 35 reflective optical surfaces are substantially fully mirrored surfaces located within the primary transmission housing 40. Furthermore, as previously disclosed in a preferred embodiment, the last reflective optical surface 36 is the concave transparent interior surface 48 of the outer dust cover 47, which is comprised of a transparent material, such as polycarbonate. This five-reflector HMD device is capable of generating a text-readable diagonal FOV, in which text is readable from one corner of the FOV to an opposite diagonal corner of the FOV, of between about 1-degree and about 60-degrees. More specifically, this five-reflector HMD device is capable of generating a non-exclusive, text-readable diagonal FOV of about 50-degrees or about 60-degrees, with little or no distortion of the projected visual content. Alternatively, the five-reflector HMD device is also capable of generating diagonal FOV's significantly larger than 50-degrees or 60-degrees when certain amounts of various distortional effects related to the projected visual content, such as pincushion or barrel distortion, are deemed to be acceptable or desired by the user. In that regard, for embodiments in which information around the periphery of the FOV does not need to be text-readable, the five-reflector HMD is capable of generating a diagonal FOV greater than 100-degrees. However, the disclosure of the aforementioned five reflector HMD device should not be read to limit the scope of HMD devices to only those HMD devices utilizing five reflective optical surfaces. Accordingly, alternate embodiments may exist that utilize fewer than, or more than, five reflective optical surfaces and that continue to fall within the scope of the present disclosure.

Referring to FIGS. 5 and 6, in an alternate embodiment, the HMD device 5 may be a device that has a total of three reflective optical surfaces 30, with the at least one intermediate reflective optical surface 32 comprising a second 33 reflective optical surface. In this alternate embodiment, the first reflective optical surface 31 is a concave surface, the second reflective optical surface 33 is a convex surface, and both of the first 31 and second 33 reflective optical surfaces are substantially fully mirrored surfaces located within the primary transmission housing 40. Additionally, the last reflective optical surface 36 is the concave, transparent interior surface of the outer dust cover 47, which is comprised of a transparent material, such as polycarbonate. This three-reflector HMD device is capable of generating a text-readable diagonal FOV of between about 1-degree and about 40-degrees. More specifically, this three-reflector HMD device is capable of generating a non-exclusive, text-readable diagonal FOV about 25-degrees or about 40-degrees with little or no distortion of the projected visual content. However, as with the five-reflector device discussed above, the three-reflector HMD device is also capable of generating diagonal FOV's significantly larger than 25-degrees or 40-degrees when certain amounts of various distortional effects related to the projected visual content, such as pincushion or barrel distortion, are deemed to be acceptable or desired by the user. In that regard, for embodiments in which information around the periphery of the FOV does not need to be text-readable, the three-reflector HMD is capable of generating a diagonal FOV greater than 80-degrees.

Determining the Geometry of the Reflective Optical Surfaces

The geometric shapes of each of the reflective optical surfaces are determined by utilizing a high end optical design software, such as CODE-V written by Optical Research Associates, ZEMAX written by ZEMAX Development Corporation, or OSLO written by Sinclair Optics, Inc. in order to define the shapes of the reflective optical surfaces based on a large list of independent design input variables chosen by, and having input values set by, a HMD system developer. Each of these aforementioned software packages should be familiar to one skilled in the art of optical system design.

The shape of each mirror and the associated algorithms that define the shape of each mirror are output by the software and are determined based on a significant number of input variables that are chosen by, and have their values set by, the system developer. These variables are specific design parameters that are chosen based on the desired overall system or the specific design requirements. The operator of the software must independently select the design input variables and their associated values and input them into the optical design software prior to running a computer analysis that will output the geometric shapes and the associated algorithms that define those shapes. Among the lengthy list of design variables whose values need to be determined and input into the software, prior to running any computer analysis, are the following: the desired number of separate reflective optical surfaces and/or refractive elements in the overall primarily reflective-based system; whether each reflective optical surface is to be concave, convex, flat, some unique alternate geometry, or a combination thereof; the desired range of eye-relief related to the last reflective optical surface; the desired dimensions of the eyebox; the desired FOV angle for the overall reflective system; the amount of acceptable or desired visual content distortion, such as pincushion or barrel distortion, that may be observed by the HMD device user; the desired dimensions of the overall system package (i.e. the package envelope); the desired exiting angle of vision; whether mixed-reality viewing is desired; the manner in which the projected light waves will enter the system from the visual source 20 and the desired manner in which they should exit the system from the last optical surface 36; and whether you want the overall system to be an above-eye, below-eye, or to the side of the eye system.

This list is by no means an exhaustive list of variables and has been provided as an exemplification of possible system design choice input variables. Other design variables exist that will affect the output of the software analysis and any resulting mathematical algorithms that define the shape of each reflective optical surface. The variables that are input into the software depend solely on the desired overall system design requirements of the HMD device.

The following descriptions are provided in order to further clarify and define the aforementioned design variables referenced above. The eye relief is the distance from the pupil of the user's eye to the center point of the last reflective optical surface. The eyebox is the virtual area through which the near parallel light bundle coming from the last reflective optical surface may enter the user's eye. The eye box is often a circular area defined by a diameter that is at least as large as, if not significantly larger than, the pupil of the user's eye. For example, if in an average lighting situation the typical user has a pupil that is 2 millimeters in diameter, it may be desirable to choose an eyebox dimension that is 10 millimeters in diameter. This would allow the user to move the pupil of his eye within the eyebox in an upward, downward, left, or right direction and not lose sight of the visual content that is reflected off of the last reflective optical surface and that is passing through the larger 10 mm eyebox. The FOV, as discussed previously, refers to the swept angular extent (often a diagonal angle) to which a user can see observable content reflected from the last reflective optical surface. The dimension of the overall system package, or the "package envelope," refers to the outer dimensions of the overall HMD device, including all optics housings. Lastly, the exiting angle of vision refers to, in a mixed-reality view, the overall allowable angle of vision in which the user can view the outside world through the HMD device while wearing the HMD device.

Once the variables are chosen and their desired values have been determined by the system designer, the designer then initiates the analytical portion of the optical design software to run a computer design analysis in order to determine the overall geometric shape of each reflective optical surface and their associated locations relative to each other and relative to the user's eye. When the analysis is completed, the software outputs a complex algorithm that defines the shape of each geometric surface. If even a single one of the significant number of input variables is changed or altered even slightly, the geometric shape of each reflective optical surface, their relative positions, and the resulting mathematical algorithms that define the geometric surfaces will change completely. Accordingly, there is only one specific generic formula used to define the geometry of each surface, which is based on the specific values of the chosen set of input variables. Therefore, with so many options of input variables and corresponding values of those variables, there are quite literally an infinite number of possible reflective optical surface geometries and associated algorithms to define those geometries, all based on the specific combination of independent input variables that are chosen and their selected values.

Operation of the HMD Device

Referring to FIG. 1, in operation, the preferred embodiment of the five-reflector HMD device 5 works as follows. An HMD device user places the frame 10 and the attached optics housings 15 of the HMD device 5 onto his head as he would a pair of eyeglasses. The optics housings 15 are positioned such that the secondary vision housings 45 are located in front of the user's eyes with the front dust cover 46 and the outer dust cover 47 being located in the user's direct line of sight. The user first sees through the transparent front dust cover 46 and then through the transparent outer dust cover 47 to view his surrounding environment. If the user does not naturally have at least 20/20 vision, and generally requires some type of prescription lens correction to achieve 20/20 vision, then a prescription lens may be attached to the secondary vision housing's 45 front dust cover 46 between the user's eye and the front dust cover 46.

Figure 7:
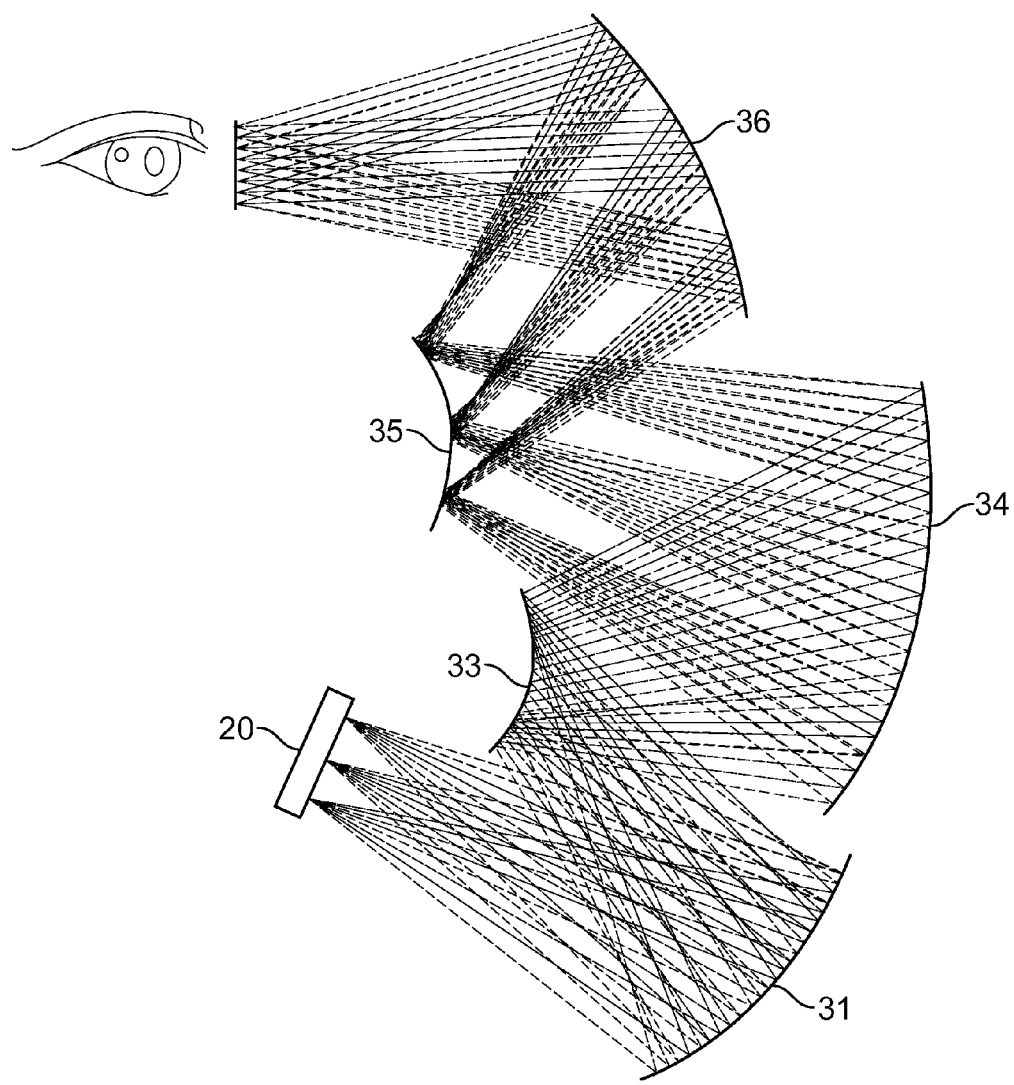
FIG. 7 is a side schematic view of an embodiment of the reflective optical surfaces in a five-reflector head mounted display device illustrating an embodiment of the path of light reflection from the light-emitting visual source to a user's eye.
Figure 8:
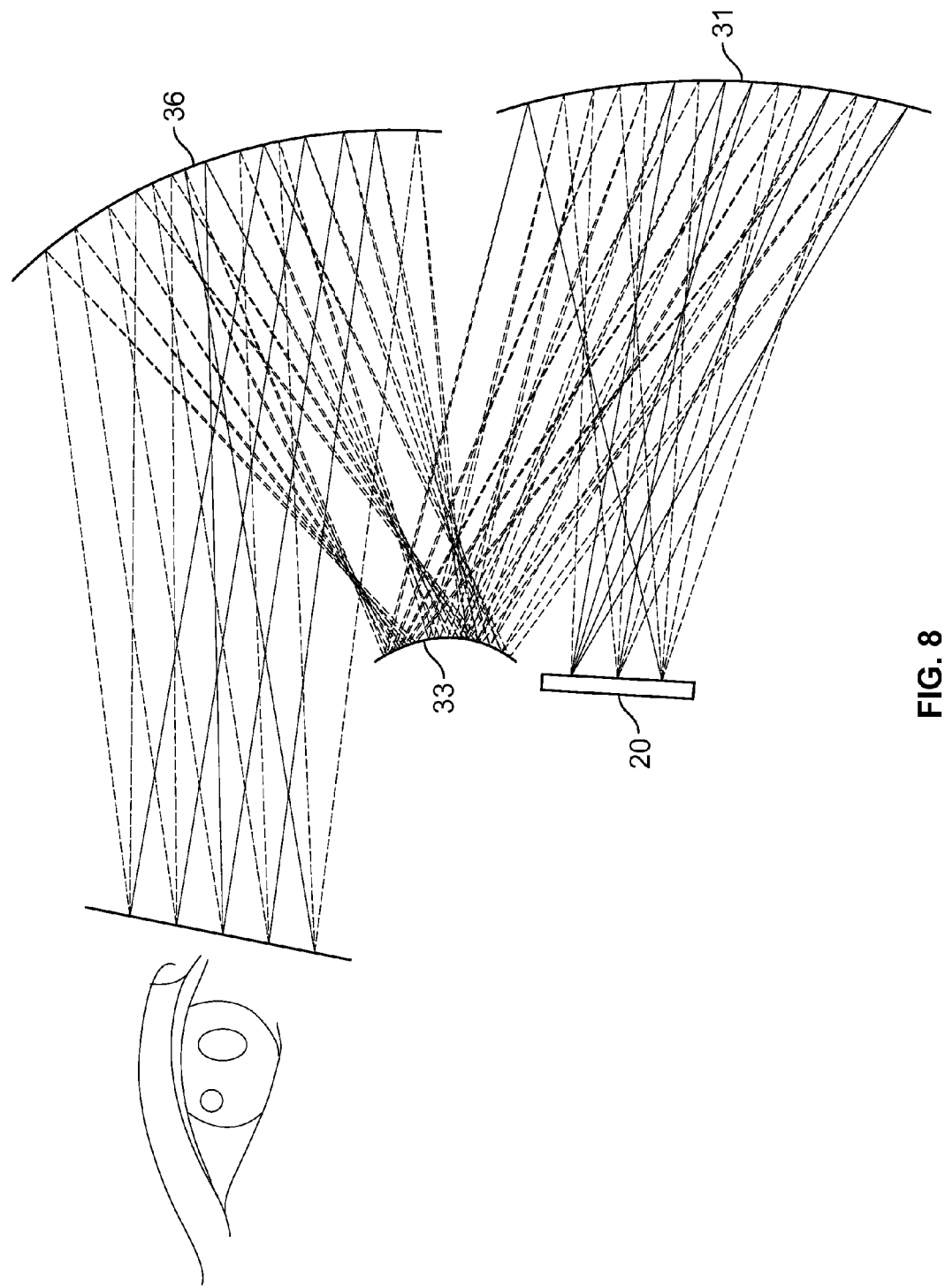
FIG. 8 is a side schematic view of an embodiment of the reflective optical surfaces in a three-reflector head mounted display device illustrating an embodiment of the path of light reflection from the light-emitting visual source to a user's eye.

Power is supplied to both the light-emitting visual source 20 as well as the variable translucent layer 50 that is in communication with the outer dust cover 47. A visual input signal is sent to the source input of the light-emitting visual source 20. The light-emitting visual source 20 accepts the visual input signal and converts it into visual content to be projected. Referring to FIGS. 3A and 7 for the five-reflector HMD device (see FIGS. 6 and 8 for the three-reflector HMD device), the visual content displayed on the light-emitting visual source 20 is projected there from to the concave, first reflective optical surface 31. The concave, first reflective optical surface 31 then reflects the projected visual content to the convex, second reflective optical surface 33. The convex, second reflective optical surface 33 then reflects the projected visual content to the concave, third reflective optical surface 34. The concave, third reflective optical surface 34 then reflects the projected visual content to the convex, fourth reflective optical surface 35. Each of the first 31, second 33, third 34, and fourth reflective optical surfaces 35 are substantially fully mirrored surfaces. The convex fourth reflective optical surface 35 then reflects the projected visual content to the concave, last reflective optical surface 36, which, in the preferred embodiment, is also the interior surface 48 of the transparent outer dust cover 47. The interior surface 48 of the transparent outer dust cover 47, and accordingly the last reflective optical surface 36, may be a partial mirror as previously described. The concave last reflective optical surface 36 then reflects the projected visual content through the front dust cover 46, as well as through any prescription lens attached thereto, and into a user's eye, or more specifically, to a virtual eyebox, where the visual content appears magnified and in focus.

However, the disclosure of the operation of this embodiment should not be read to limit the order in which the projected visual content is reflected from each of the plurality of reflective optical surfaces 30. In other words, the order in which the visual content is reflected from the reflective surfaces is not limited to only reflections occurring in a sequentially numbered order, with each reflective surface only being utilized for one reflection of the visual content. Rather, it should be appreciated by one skilled in the art that a single reflective optical surface may, in alternate embodiments, be able to be used to perform multiple reflections of the projected visual content or to reflect the light from the projected visual through a refractive lens element located the optical path before the projection of the visual content reaches its desired final target. In this manner, in reflective HMD devices that would otherwise require a larger number of reflective surfaces to attain a larger magnification and substantially larger FOV than those disclosed herein, the same desired magnification and FOV may be achieved by utilizing fewer reflective surfaces in which one, or several, of the reflective surfaces perform multiple reflections of the visual content before the content reaches the user's eye.

For example, in a system that would otherwise utilize seven reflective optical surfaces to achieve a specific desired magnification and FOV angle (i.e. the sequential order of reflection of the visual content is: Reflector #1, Reflector #2, Reflector #3, Reflector #4, Reflector #5, Reflector #6, Reflector #7), the same magnification and FOV may be able to be achieved with only five reflective optical surfaces, by utilizing one of the five reflective optical surface to perform the reflections of what otherwise would require three separate reflective optical surfaces (i.e. the order of reflection of the projected visual content could be: Reflector #1, Reflector #2, Reflector #3, Reflector #1, Reflector #4, Reflector #5, Reflector #1).

Continuing on with the disclosure of the operation of the preferred embodiment, if the visual content projected to the user's eye is not immediately seen by the user as being bright enough or clear and in focus, there are several adjustments the user can make to the HMD device 5 to improve or optimize the user's see-through vision and achieve a more balanced mixed-reality view. First, referring to FIGS. 9A to 9C, regarding the brightness of the projected visual content, if the user feels that the visual content is not bright enough, the user can make adjustments to the variably-adjustable transmission-loss layer 50 to make the layer 50 darker and more opaque, and in turn increase the transmission-loss of outside light passing there through to make the projection of the visual content appear brighter. However, doing so also decreases the amount of light entering the user's eye from the surrounding environment and thus darkens the user's view of the real-world surrounding environment that is seen through the projected visual content in the mixed-reality view. Conversely, if the user's view of the surrounding environment is too dark to be seen, or if it is simply not at the user's desired brightness level, then the user may adjust the adjustable transmission-loss layer 50 to make the layer 50 appear lighter and more transparent. This will decrease the transmission-loss of outside light passing there through and allow more light from the surrounding environment to pass through the layer 50 to reach the user's eye. This however, has the effect of making the projected visual content appear lighter or less vivid to the user in the mixed-reality view.

Second, referring to FIG. 4, regarding the clarity of the projected visual content seen by the user, if the projected visual content is not clearly in focus, the user may make manual adjustments to the diopter adjuster 25 so as to move the light-emitting visual source 20 closer to or further away from the first reflective optical surface 31 located inside the primary transmission housing 40. This results in a corresponding adjustment to the position of the final focal point of the projected visual content within the user's eye, or within the eyebox, thus allowing the user to clearly focus the visual content.

One of the major benefits associated with a primarily reflective-based HMD device 5, as presently disclosed herein, is that because there is no need for any heavy glass or acrylic refractive lenses and mounting hardware within the device in order to achieve magnification and focus of the projected visual content, the HMD device 5 is extremely lightweight and comfortable for the user to wear, more so than any other available HMD device. Furthermore, because the reflective-optics do not require separate and expensive refractive lenses, the manufacturing cost associated with the HMD device disclosed herein are significantly less than other HMD devices currently available in the consumer, commercial, or military markets. This also translates to a significantly lower purchase price for the final HMD device 5. In addition, the primarily reflective-based HMD device 5 as disclosed herein is capable of achieving large text-readable FOV angles and increasing the FOV angle from one embodiment of the device to another embodiment of the device without adding significant cost or weight to the HMD device 5. Lastly, another benefit associated with the HMD device disclosed herein is that because the optics housings 15 of the primarily reflective-based HMD device 5 are extremely compact, the HMD device 5 is a near-to-eye device.

As a person skilled in the art will recognize from the previous detailed description and from the figures and claims, modifications and changes can be made to the preferred embodiment of the invention without departing from the scope of the disclosure and claims.

What is claimed is:

1. A reflective-based, head mounted display device comprising:
   a wearable, head mounted frame; and
   at least one near-to-eye optics housing connected to said frame and configured to be positioned at least partially in front of an eye of a user, said optics housing comprising:
      a light-emitting visual source for projecting visual content;
      a plurality of reflective optical surfaces in optical communication with said light-emitting visual source; and
      an optical path defined by said plurality of reflective optical surfaces, said optical path extending from said light-emitting visual source to an eyebox of said optical path,
   wherein said plurality of reflective optical surfaces are configured to reflect light rays from a projection of said visual content between each one of said reflective optical surfaces in a predefined sequential order along said optical path and into said eyebox, and
   wherein said optical path is free of refractive optical lenses between said light emitting visual source and a last of said plurality of reflective optical surfaces to reflect light rays from said projection of said visual content, and
   wherein said reflective optical surfaces are configured to cooperatively magnify said projection of said visual content, such that said projected visual content appears magnified when viewed at said eyebox.

2. The head mounted display device of claim 1, further comprising a first near-to-eye optics housing and a second near-to-eye optics housing, both connected to said frame, wherein said first optics housing is configured such that it may be positioned at least partially in front of a first eye of said user to project a first visual content to said first eye, and wherein said second optics housing is configured such that it may be positioned at least partially in front of a second eye of said user to project a second visual content to said second eye.

3. The head mounted display device of claim 1, wherein said frame is an eyeglasses frame.

4. The head mounted display device of claim 1, wherein said optics housing further comprises a primary transmission housing and a secondary vision housing, wherein said secondary vision housing is configured to be disposed in front of said user's eye and is connected to said primary transmission housing.

5. The head mounted display device of claim 4, wherein said secondary vision housing comprises a transparent front dust cover configured to be positioned in front of said user's eye and configured to allow said user to see there through.

6. The head mounted display device of claim 5, wherein said secondary vision housing further comprises an outer dust cover configured to be positioned in front of said front dust cover wherein said front dust cover and outer dust cover are configured to cooperatively seal said optics housing from environmental contaminants.

7. The head mounted display device of claim 6, wherein said outer dust cover is transparent and is configured to allow said user to see there through.

8. The head mounted display device of claim 7, further comprising a variably-adjustable transmission-loss layer, wherein said adjustable transmission-loss layer is configured to be in communication with said outer dust cover.

9. The head mounted display device of claim 8, wherein said adjustable transmission-loss layer can selectably be made to be fully transparent to allow said user to see through said transparent outer dust cover and said adjustable transmission-loss layer to a surrounding environment.

10. The head mounted display device of claim 8, wherein said adjustable transmission-loss layer can selectably be made to be completely dark to prevent said user from seeing through said outer dust cover and said adjustable transmission-loss layer.

11. The head mounted display device of claim 8, wherein said adjustable transmission-loss layer can selectably be made to have varying levels of darkness to allow said user to partially see through said outer dust cover and said adjustable transmission-loss layer to a surrounding environment.

12. The head mounted display device of claim 7, wherein an inner surface of said outer dust cover is a reversible mirror.

13. The head mounted display device of claim 1, wherein said plurality of reflective optical surfaces comprises a series of reflective optical surfaces, including at least a first reflective optical surface and a last reflective optical surface, for reflecting said visual content off of each reflective optical surface beginning with said first reflective optical surface, and wherein said last reflective optical surface is an interior surface of said outer dust cover, and from which interior surface said visual content is last reflected to said eyebox.

14. The head mounted display device of claim 13, wherein said visual content is reflected off of each reflective optical surface beginning with said first reflective optical surface and ending with said last reflective optical surface.

15. The head mounted display device of claim 13, wherein said first reflective optical surface is a convex surface and said last reflective optical surface is a concave surface.

16. The head mounted display device of claim 13 further comprising at least one intermediate reflective optical surface.

17. The head mounted display device of claim 16, wherein said first reflective optical surface and said last reflective optical surface are concave surfaces.

18. The head mounted display device of claim 17, wherein said at least one intermediate reflective optical surface comprises a second reflective optical surface that is a convex surface.

19. The head mounted display device of claim 17, wherein said at least one intermediate reflective optical surface comprises a second reflective optical surface that is a convex surface, a third reflective optical surface that is a concave surface, and a fourth reflective optical surface that is a convex surface.

20. The head mounted display device of claim 4, wherein said primary transmission housing is configured to be substantially located below said frame.

21. The head mounted display device of claim 4, wherein said primary transmission housing is configured to be substantially located above said frame.

22. The head mounted display device of claim 1, wherein said light-emitting visual source is a micro-display.

23. The head mounted display device of claim 1, further comprising a diopter adjuster in communication with said light-emitting visual source, wherein said diopter adjuster is configured to move said light-emitting visual source forward or backward, relative to a direction of visual content projection from said light-emitting visual source, so as to provide focus correction of said visual content.

24. The head mounted display device of claim 1, wherein said head mounted display device generates at least a 60-degree text-readable diagonal field-of-view at said eyebox.

25. The head mounted display of claim 1, further comprising a refractive element located in said optical path between said last of said plurality of reflective optical surfaces and said eyebox.

26. A reflective-based, head mounted display device comprising:
 a wearable, head mounted frame; and
 at least one near-to-eye optics housing connected to said frame and configured to be positioned at least partially in front of an eye of a user, said optics housing comprising:
  a light-emitting visual source for projecting visual content
  a plurality of reflective optical surfaces in optical communication with said light-emitting visual source; and
  an optical path defined by said plurality of plurality of reflective optical surfaces, said optical path extending from said light-emitting visual source to an eyebox of said optical path,
  wherein said plurality of reflective optical surfaces are configured to reflect light rays from a projection of said visual content between each one of said reflective optical surfaces in a predefined sequential order along said optical path and into said eyebox, and
  wherein said optical path is free of refractive optical lenses between said light emitting visual source and a last of said plurality of reflective optical surfaces to reflect light rays from said projection of said visual content.

27. The head mounted display device of claim 26, wherein said reflective optical surfaces are configured to cooperatively magnify said projection of said visual content, such that said projected visual content appears magnified when viewed at said eyebox.

28. The head mounted display device of claim 26, further comprising a first near-to-eye optics housing and a second near-to-eye optics housing, both connected to said frame, wherein said first optics housing is configured such that it may be positioned at least partially in front of a first eye of said user to project a first visual content to said first eye, and wherein said second optics housing is configured such that it may be positioned at least partially in front of a second eye of said user to project a second visual content to said second eye.

29. The head mounted display device of claim 26, wherein said optics housing further comprises a primary transmission housing and a secondary vision housing, wherein said secondary vision housing is configured to be disposed in front of said user's eye and is connected to said primary transmission housing.

30. The head mounted display device of claim 29, wherein said secondary vision housing comprises a transparent front dust cover configured to be positioned in front of said user's eye and configured to allow said user to see there through.

31. The head mounted display device of claim 30, wherein said secondary vision housing further comprises an outer dust cover configured to be positioned in front of said front dust cover wherein said front dust cover and outer dust cover are configured to cooperatively seal said optics housing from environmental contaminants.

32. The head mounted display device of claim 31, wherein said outer dust cover is transparent and is configured to allow said user to see there through.

33. The head mounted display device of claim 32, further comprising a variably-adjustable transmission-loss layer, wherein said adjustable transmission-loss layer is configured to be in communication with said outer dust cover.

34. The head mounted display device of claim 33, wherein said adjustable transmission-loss layer can selectably be made to be fully transparent to allow said user to see through said transparent outer dust cover and said adjustable transmission-loss layer to a surrounding environment.

35. The head mounted display device of claim 33, wherein said adjustable transmission-loss layer can selectably be made to be completely dark to prevent said user from seeing through said outer dust cover and said adjustable transmission-loss layer.

36. The head mounted display device of claim 33, wherein said adjustable transmission-loss layer can selectably be made to have varying levels of darkness to allow said user to partially see through said outer dust cover and said adjustable transmission-loss layer to a surrounding environment.

37. The head mounted display device of claim 32, wherein an inner surface of said outer dust cover is a reversible mirror.

38. The head mounted display device of claim 26, wherein said plurality of reflective optical surfaces comprises a series of reflective optical surfaces, including at least a first reflective optical surface and a last reflective optical surface, for reflecting said visual content off of each reflective optical surface beginning with said first reflective optical surface, and wherein said last reflective optical surface is an interior surface of said outer dust cover, and from which interior surface said visual content is reflected to said eyebox.

39. The head mounted display device of claim 38, wherein said visual content is reflected off of each reflective optical surface beginning with said first reflective optical surface and ending with said last reflective optical surface.

40. The head mounted display device of claim 38, wherein said first reflective optical surface is a convex surface and said last reflective optical surface is a concave surface.

41. The head mounted display device of claim 38 further comprising at least one intermediate reflective optical surface.

42. The head mounted display device of claim 41, wherein said first reflective optical surface and said last reflective optical surface are concave surfaces.

43. The head mounted display device of claim 42, wherein said at least one intermediate reflective optical surface comprises a second reflective optical surface that is a convex surface.

44. The head mounted display device of claim 42, wherein said at least one intermediate reflective optical surface comprises a second reflective optical surface that is a convex surface, a third reflective optical surface that is a concave surface, and a fourth reflective optical surface that is a convex surface.

45. The head mounted display device of claim 29, wherein said primary transmission housing is configured to be substantially located below said frame.

46. The head mounted display device of claim 29, wherein said primary transmission housing is configured to be substantially located above said frame.

47. The head mounted display device of claim 26, wherein said light-emitting visual source is a micro-display.

48. The head mounted display device of claim 26, further comprising a diopter adjuster in communication with said light-emitting visual source, wherein said diopter adjuster is configured to move said light-emitting visual source forward or backward, relative to a direction of visual content projection from said light-emitting visual source, so as to provide focus correction of said visual content.

49. The head mounted display device of claim 26, wherein said head mounted display device generates at least a 60-degree text-readable diagonal field-of-view at said eyebox.

50. The head mounted display device of claim 26 further comprising a refractive element located in said optical path between last of said reflective optical surfaces and said eyebox.

51. A reflective, head mounted display device comprising:
   a frame; and
   at least one optics housing connected to said frame and configured to be positioned at least partially in front of an eye of a user, said optics housing comprising:
      a light-emitting visual source disposed within said optics housing for projecting visual content;
      a plurality of reflective optical surfaces in optical communication with said light-emitting visual source; and
      an optical path defined by said plurality of plurality of reflective optical surfaces, said optical path extending from said light-emitting visual source to an eyebox of said optical path,
      wherein said plurality of reflective optical surfaces are configured to reflect a projection of said visual content between each one of said reflective optical surfaces in a predefined sequential order along said optical path and into said eyebox,
      wherein said optical path is free of refractive optical lenses between said light emitting visual source and a last of said plurality of reflective optical surfaces to reflect light rays from said projection of said visual content.

52. The head mounted display device of claim 51, wherein said frame is a wearable, head mounted frame.

53. The head mounted display device of claim 51, wherein said reflective optical surfaces are configured to cooperatively magnify said projection of said visual content, such that said projected visual content appears magnified when viewed at said eyebox.

54. A method of projecting magnified visual content to an eyebox of a head mounted display device, comprising:
   providing a wearable head mounted display, configured to be placed onto a user's head and in front of at least one of said user's eyes, said head mounted display comprising a frame and at least one near-to-eye optics housing connected to said frame, said optics housing comprising at least one light-emitting visual source disposed within said optics housing for projecting visual content, and a plurality of reflective optical surfaces disposed within said optics housing defining an optical path along which said projected visual content is reflective from said light-emitting visual source to said eyebox, wherein said reflective optical surfaces are configured to successively reflect a magnified projection of said content to said eyebox, and wherein said optical path is free of refractive optical lenses between said light emitting visual source and a last of said plurality of reflective optical surfaces to reflect light rays from said projection of said visual content;
   providing an input signal to said light-emitting visual source to produce visual content to be projected;
   reflecting said projected content off of said reflective optical surfaces such that said last reflective optical surface reflects said content to said eyebox, wherein said content will appear magnified.

55. The method of claim 54, wherein said input signal is an output signal from a computer.

56. The method of claim 54, wherein said input signal is a video signal.

57. The method of claim 54, wherein said input signal is an image signal.

58. The method of claim 54, wherein said input signal contains static visual content.

59. The method of claim 54, wherein said input signal contains dynamic visual content.

* * * * *